United States Patent
Rossier et al.

(10) Patent No.: US 10,628,647 B1
(45) Date of Patent: Apr. 21, 2020

(54) AUTHENTICATION AND TRACKING BY HIDDEN CODES

(71) Applicants: Romain Rossier, Vionnaz (CH); Roger D. Hersch, Epalinges (CH)

(72) Inventors: Romain Rossier, Vionnaz (CH); Roger D. Hersch, Epalinges (CH)

(73) Assignee: Innoview Sarl, Epalinges (CH)

( * ) Notice: Subject to any disclaimer, the term of this patent is extended or adjusted under 35 U.S.C. 154(b) by 0 days.

(21) Appl. No.: 16/261,611

(22) Filed: Jan. 30, 2019

(51) Int. Cl.
*G06K 7/08* (2006.01)
*G06K 7/14* (2006.01)
*G06K 7/10* (2006.01)

(52) U.S. Cl.
CPC ....... *G06K 7/1417* (2013.01); *G06K 7/10722* (2013.01)

(58) Field of Classification Search
CPC .......... G06K 7/00; G06K 7/10881; G06K 2007/10524; G06K 7/1447
USPC .......... 235/451, 462.25, 462.45, 472.01
See application file for complete search history.

(56) References Cited

U.S. PATENT DOCUMENTS

| | | | | |
|---|---|---|---|---|
| 7,058,202 B2* | 6/2006 | Amidror | ........... | B42D 25/342 283/93 |
| 7,194,105 B2* | 3/2007 | Hersch | ........... | B42D 25/342 382/100 |
| 7,305,105 B2* | 12/2007 | Chosson | ........... | G07D 7/20 380/258 |
| 7,710,551 B2* | 5/2010 | Hersch | ........... | G07D 7/207 356/71 |
| 8,351,087 B2* | 1/2013 | Amidror | ........... | B44F 1/10 358/3.28 |
| 2017/0113481 A1 | 4/2017 | Hersch et al. | | |

OTHER PUBLICATIONS

S. Chosson and R.D. Hersch, Beating Shapes Relying on Moire Level Lines, ACM Transactions on Graphics, vol. 34, No. 1, Article 9,10 pp.+ two page Appendix, published Dec. 2014.
Adam Polak, Master Thesis "Flashy Shapes Recognition", written Sep. 2014.
S. Suzuki, K. Abe, Topological structural analysis of digitized binary images by border following, Computer Vision, Graphics, and Image Processing vol. 30, No. 1, 1985 32-46.
H. Douglas, T. K. Peucker, Algorithms for the reduction of the number of points . . . , Cartographica, vol. 10 No. 2, 1973, 112-122.

(Continued)

*Primary Examiner* — Daniel St Cyr

(57) ABSTRACT

The present disclosure describes an authentication and tracking system relying on spatial codes hidden into a grayscale, variable intensity or color multigrating reproduced on a substrate. The authentication software running in a smartphone takes pictures of the multigrating and applies perspective correction and fine grain rectification. The hidden spatial code is made apparent by the phase-controlled superposition of the fine grain rectified multigrating and a corresponding digital revealing layer grating. Subsequent image processing operations enable extracting the hidden spatial code, decode it and authenticate the corresponding document or good, by sending the decoded message to an authentication and tracking computing server. Applications include the authentication and tracking of documents and goods as well as the localization of persons.

33 Claims, 23 Drawing Sheets

(56) References Cited

OTHER PUBLICATIONS

R. Hartley, A. Zisserman, Multiple View Geometry in Computer Vision, Section 2.3 Projective transformations, 2nd Edition, Cambridge University Press, 2003, pp. 32-36.
N. Otsu, A threshold selection method from gray-level histograms, IEEE Transactions on Systems, Man and Cybernetics vol. 9, No. 1, 1979, pp. 62-66.
I. Amidror, The Theory of the Moiré Phenomenon, vol. 1: Periodic Layers, 2nd edition, Section 11.2, Springer, pp. 353-359 (2009).
D. Bradley, G. Roth, Adaptive Thresholding Using the Integral Image, Journal of Graphics Tools, vol. 12, No. 2, Taylor and Francis, 2007, pp. 13-21.
H. Douglas, T. K. Peucker, Algorithms for the reduction of the No. Of points . . . , Cartographica, vol. 10 No. 2, 1973, 112-122.
Thomas Walger, Roger D. Hersch, "Hiding Information in Multiple Level-line Moirés", in Proc. ACM DocEng Conf., Lausanne, Switzerland, pp. 21-24 (2015).

* cited by examiner

AUTHENTICATION AND TRACKING BY HIDDEN CODES

CROSS-REFERENCE TO RELATED APPLICATIONS

The present application is related to U.S. patent application Ser. No. 14/703,017, filed Oct. 27, 2015, inventors Hersch et al, also inventor in the present application, incorporated herein by reference. It is also related to U.S. Pat. No. 7,305,105, filed Jun. 10, 2005, to Chosson and Hersch (also inventor in present invention) which is herein incorporated by reference. Additional references herein incorporated are located at the end of the present specification.

FIELD OF THE DISCLOSURE

The present disclosure describes a system for authenticating and tracking documents, or goods as well as for localizing persons using a mobile computing device such as a smartphone. The smartphone takes pictures of a base layer multigrating hiding spatial code messages. When the acquired and perspectively corrected base layer multigrating is superposed with a corresponding digital revealing layer grating, one of the hidden messages appears as a level-line moiré. This hidden message is related to the document or good being authenticated and/or tracked or to the spatial position of the person being localized. In order to quickly reveal with a high rate of success the hidden spatial code messages, a high superposition registration accuracy is required between the acquired and perspectively corrected base layer multigrating and the superposed digital revealing layer grating. Fine grain rectification and phase control enable reaching such a high registration accuracy.

BACKGROUND

Documents such as identity cards as well as goods such as pharmaceutical products are items that need to be authenticated and tracked. There is a need to differentiate between authentic products and counterfeited ones. A thorough authentication can be performed by comparing the identifier of a document whose authenticity is to be verified with identifiers of original valid documents that have been issued. Similarly, the identifier of a good whose authenticity is to be verified should be compared with identifiers of the authentic goods. Identifiers of original documents or goods may be overt or covert.

In the present invention, the identifiers are encoded as spatial codes that are hidden within a halftone multigrating image reproduced on the document or good to be protected. Means are disclosed to hide a spatial code message within an apparently variable intensity or variable color image that is formed by the halftone of a line grating. The spatial code message is revealed by a smartphone acquiring with its camera an image of the region of a document or product where the spatial code is hidden and by digitally superposing onto the acquired image a corresponding matching digital revealing layer grating. Such a region may show a visible graphic element, a logo, a text, a face or any other grayscale, variable intensity or color image. The smartphone is connected through the Internet with an authentication and tracking computing server. This computing server verifies the authenticity of the acquired and decoded spatial code messages and sends an acknowledge message back to the smartphone having performed the acquisition. The computing server also tracks the corresponding documents or products by registering their identity as well as the smartphone identifier, date, time and geographic location of the corresponding image acquisition.

In nearly every industry branch, there is a need to track the products that are being sold. There is also a need to track user responses to advertisement campaigns. One may also use a similar tracking infrastructure to track persons that move within a given environment, for example the area of a production site.

Today's tracking systems rely mainly on messages incorporated into barcodes, data matrix codes, Aztec codes or QR-codes. These kinds of codes have the disadvantage of being directly visible to human beings and at the same time of being relatively ugly. There is a need of hiding these codes and the message that they carry about a product, a service or a person. For example, hiding such a code within a product label helps raising the acceptability of that product. As a further example, a personal pass containing information hidden within the face image of the document holder reinforces the security of that pass and at the same time increases its acceptability among the holders of these documents. The main advantage of the proposed system for hiding spatial codes resides in the fact that the spatial codes are not modifiable without knowing the parameters with which they were synthesized. Such non-modifiable hidden spatial codes offer a strong additional protection, compared with classical overt 1D or 2D barcodes.

The present disclosure describes an authentication and tracking system where these codes are used, but are hidden into grayscale, variable intensity or color images that have a significance for the human observer. For example, if a company wants to track its product, e.g. a camera, it may print a small label pasted onto the camera housing that shows the logo of the company, namely a camera diaphragm. Without being informed, persons looking at such a picture cannot guess that it hides a spatial code containing a message. When printed as a base layer multigrating image, the camera diaphragm may be photographed by a smartphone running the authentication and tracking software. The authentication and tracking software applies perspective correction, fine grain rectification, phase-controlled superposition of a matching revealing layer grating as well as image processing operations to extract the hidden spatial code, decode it and send it to the computing center of the company having produced the camera. In addition to the information decoded from the acquired image, the authentication and tracking software delivers useful information, such as the date, time and location where the picture was taken. The person holding the smartphone may then receive information telling him that this camera product is genuine and not a counterfeit. With hundreds of thousands of customers interested in buying such cameras, the company is then able to build a geographic map showing the location of its potential customers. It will also get information about the gray market, i.e. countries where these cameras are imported without authorization from the manufacturer.

U.S. patent application Ser. No. 11/149,017, now U.S. Pat. No. 7,305,105 filed Jun. 10, 2005, entitled "Authentication of secure items by shape level lines", inventors Chosson and Hersch (also inventor in the present application), gives information useful to understand the present disclosure. Shape level line techniques have also been published in December 2014, see reference [Chosson and Hersch 2014] at the end of the present specification, incorporated herein by reference. Shape level line moirés occur in a superposition image when a base layer comprising a line grating locally shifted according to the elevation of a spatially laid out shape elevation profile is superposed with a revealing layer comprising the unshifted sampling line grating. The elevation profile is generated from an initial bilevel shape image. In previous works, the initial bilevel image could be formed by printed typographic characters, symbols, a logo, or an ornament. The superposition of a base layer printed on paper and of a revealing layer printed on a transparency yields the level-line moiré, which shows the level lines of the elevation profile. By modifying the relative superposition phase of the sampling revealing layer grating in superposition with the base layer (e.g. by a translation), one may observe as shape level line moiré successions of level lines of the shape elevation profile evolving dynamically between the initial motif shape boundaries and shape foreground centers, respectively shape background centers. In patent application Ser. No. 14/703,017, the printed base and revealing layer line gratings are replaced by arrays of cylindrical lenslets, which due to their interaction with incident light, show in transmission mode similar level-line motives as their printed counterparts.

SUMMARY

In the present invention, the revealing layer grating is embodied by a digital revealing layer grating synthesized by the software of a smartphone, relying on prior knowledge about the layout and parameters of the base layer grating. The base layer line grating is also designed to hide one or several spatial codes and to enable the fast and unambiguous extraction of that hidden code when digitally superposing the base and revealing layers on a smartphone running the authentication and tracking software.

The present invention discloses a mobile electronic device with a camera, for example a smartphone, capable of acquiring a photograph of a visible surface element such as a grayscale, variable intensity or color image hiding within its grating(s) one or several spatial code messages. After acquisition by the camera, a software module running on the smartphone recognizes the frame around the image or the image boundaries forming a quadrilateral, derives from it a transformation enabling the perspective distortion correction, applies this transformation to the captured image and obtains a perspectively corrected image, i.e. an image having a substantially rectangular or square shape. A subsequent fine grain rectification operation relying on intersections of grating lines further improves the resulting rectified image. A further smartphone software module superposes on the perspectively corrected and rectified image a revealing layer grating having a well-controlled phase and applies image processing operations. The hidden spatial code is revealed within the resulting superposition image and its information message is decoded. The decoded information message can then be sent, together with the smartphone identifier, place, date, and hour of the acquisition to a computing server. This computing server is connected with the smartphone by Internet. The computing server registers the smartphone identifier, place, date, hour and information content of this acquisition. If the information content, for example a number matches either directly or through a mathematical operation a corresponding valid document or article number, the server may notify the smartphone that the corresponding document or article is authentic. In addition, when hundreds or thousands of acquisitions of the same product are made, the server can then perform statistics about the presence of the corresponding article on the world markets. The computer capable of printing the base layer images hiding information within its gratings, the smartphone capable of acquiring, of perspectively correcting, and of rectifying these images, further capable of superposing on them with the correct phase a digital revealing layer grating, of performing image processing operations, of revealing the hidden spatial code, of decoding the hidden information, and the server receiving this information form together a highly usable simple and cheap infrastructure capable of tracking security documents and goods.

Alternately, the acquired grayscale, variable intensity or color base layer multigrating image is transferred by the smartphone to the computing server and the server performs the steps of perspective correction, and fine grain rectification. The server further carries out the phase-controlled superposition of a digital revealing layer grating, carries out image processing steps such as morphological dilation or erosion, reveals the hidden spatial code, decodes the hidden information and authenticates the corresponding document or article. In addition, for tracking purposes, the server registers the corresponding decoded information together with the smartphone identifier, date, time and geographic location of the acquisition.

Note that each of the processing steps of perspective correction, fine grain rectification, phase-controlled superposition, dilation or erosion, low-pass filtering, histogram modification, and thresholding may be carried out either by the smartphone or by the computing server. Depending on the multigrating reproduction device, not all mentioned steps are necessary. In some cases, dilation, erosion and histogram modification are not necessary.

The usability of this authentication and tracking infrastructure depends on the quality of the software running in the smartphone, especially its capacity of acquiring images having different layouts and of decoding the hidden information quickly and with a high rate of success.

An infrastructure for localizing persons is similar to the infrastructure for the authentication and tracking of documents and goods. Persons can be localized within an environment by asking them to take a photograph of a picture hanging on a wall or on the door of the room or building where they are standing. Such a picture can show a halftone text, halftone graphics or a halftone image that hide one or several spatial codes. The photograph of such a picture that includes a base layer multigrating is perspectively corrected and fine grain rectified by the smartphone. Then, by the phase controlled superposition with a corresponding revealing layer grating, and by applying image processing operations, the hidden code is extracted and decoded by the smartphone. The corresponding spatial code message is sent to the computing server for localization purposes. Then, according to the received spatial code message, the server sends a message back to the smartphone and indicates, for example on a map, the exact location of the person having taken the photograph with its smartphone. In addition, the server can set up a map showing the displacement of persons through that environment. In case that the localization operation is carried out within a museum or an exhibition, the server may send back information about the museum or exhibition items that are on the same walls as the acquired photograph of the picture that includes a base layer multigrating hiding the spatial code. As an alternative, the localization may be performed locally on the smartphone that carried out the acquisition of the picture with the base layer multigrating. The smartphone may run an additional software module that associates to the decoded spatial code message localization information and shows it to the holder of the smartphone. In the museum or exhibition example, this smartphone module may run a video or sound stream that gives explanations about the museum or exhibition items that are close to the person having carried out the acquisition of the picture with the base layer multigrating. As an additional benefit for such a localization infrastructure, the server receiving the decoded spatial code messages may create a data base storing the successive displacements of the persons within the environment. In case of museums or exhibitions, such a database will be helpful in estimating the attractiveness of the items that are shown at the different locations.

The present disclosure also describes a method to create jointly a base layer multigrating hiding spatial codes and corresponding revealing layer gratings. Each grating of the multigrating has the same fundamental geometric transformation function $Q(x,y)$ as its corresponding revealing layer grating (see Equation (9)). The revealing layer grating, when superposed at the correct phase with the base layer multigrating, reveals one of the hidden spatial codes, after application of image processing operations selected from the set of morphological dilation or erosion, low-pass filtering, histogram modification and thresholding. Phase control is applied when generating the base layer multigrating and, for revealing the hidden spatial code, when generating on the smartphone the revealing layer gratings. Its aim is to ensure that when the elevation is zero, the phase difference between corresponding base and revealing layer gratings is maximal, i.e. close to ½ (i.e. level lines of base and revealer are approximately distant by half the repetition period) and that when the normalized elevation is maximal, the phase difference is close to zero (i.e. level lines of base and revealer overlap). A large phase difference ensures the presence of high-intensity lines in originally white regions of the spatial code and the absence of high-intensity lines in originally black regions of the spatial code, or vice-versa, in case that the multigrating lines are reproduced as bright lines on a dark background and that the obtained spatial code is inverted. In addition, in case of slight deformations of the reproduced base layer multigrating, a further phase control operation carried out in real-time consists for a rectilinear or quasi-rectilinear revealing layer grating in repeatedly pixel wise displacing vertically and/or horizontally the revealing layer grating (i.e. by small fractions of the repetition period) on top of the acquired, perspectively corrected, fine grain rectified base layer multigrating. After each displacement, the resulting superposition image is low-pass filtered, and the average intensity of parts of its border frame as well as its overall variance are calculated. The superposition is selected that yields (a) a relatively high intensity in the border frame ("white") and (b) the highest overall variance inside the active area of the superposition image. In a case of a curvilinear revealing layer grating, real-time phase control consists in generating instances of the revealing layer grating, at successively increasing fractional phases. The superposition with a high intensity border frame yielding after low-pass filtering the highest overall variance is selected for the further image processing operations aiming at extracting the hidden spatial code.

A variant of the present invention consist in partitioning the spatial codes in multiple segments and rearranging these segments so as to provide space for an additional information item. The rearranged spatial code segments together with the space for additional information form the extended spatial codes that are low-pass filtered and inverted to create the corresponding extended elevation profiles. These extended elevation profiles enable creating extended dither gratings that are merged into a single extended dither multigrating. A global image comprising separate motives is dithered with this extended dither multigrating. The dithering operation yields a base layer multigrating on which within the provided space the additional information item can be electronically pasted. The resulting base layer extended multigrating is then reproduced on a substrate. The separate motives forming the global image on the reproduced extended multigrating are directly observable by humans. Extraction and authentication of the message hidden within the extended multigrating by the smartphone consists in acquiring this extended multigrating, performing perspective correction and fine grain rectification, and carrying out the phase-controlled superposition of a correspondingly extended revealing layer grating. At this stage, using prior information about the positions of the spatial code segments, the corresponding superposition regions containing the spatial code segments are extracted and assembled to recreate the superposition image containing a reassembled spatial code. The smartphone then applies to the reassembled superposition image processing operations such as morphological erosion or dilation, low-pass filtering, histogram modification and thresholding. The resulting thresholded image then reveals the hidden spatial code. This spatial code is decoded and authenticated either locally or by a remote server connected with the smartphone through the Internet.

The present disclosure describes means (a) for hiding spatial codes (e.g. data matrix codes, Aztec codes, QR codes, arrangements of alphanumerical signs, etc.) into grayscale or color multigrating images, (b) means of acquiring these grayscale and color multigrating images and of obtaining information hidden within these images by the execution of software functions, (c) means of sending and receiving information with a server across communication networks such as the Internet, (d) means of tracking spatial-temporal information of documents, goods or persons, of making geo-temporal statistics on them and optionally means of integrating this spatial-temporal information into counterfeit prevention and/or marketing strategies.

FIGURES

Figure 2:
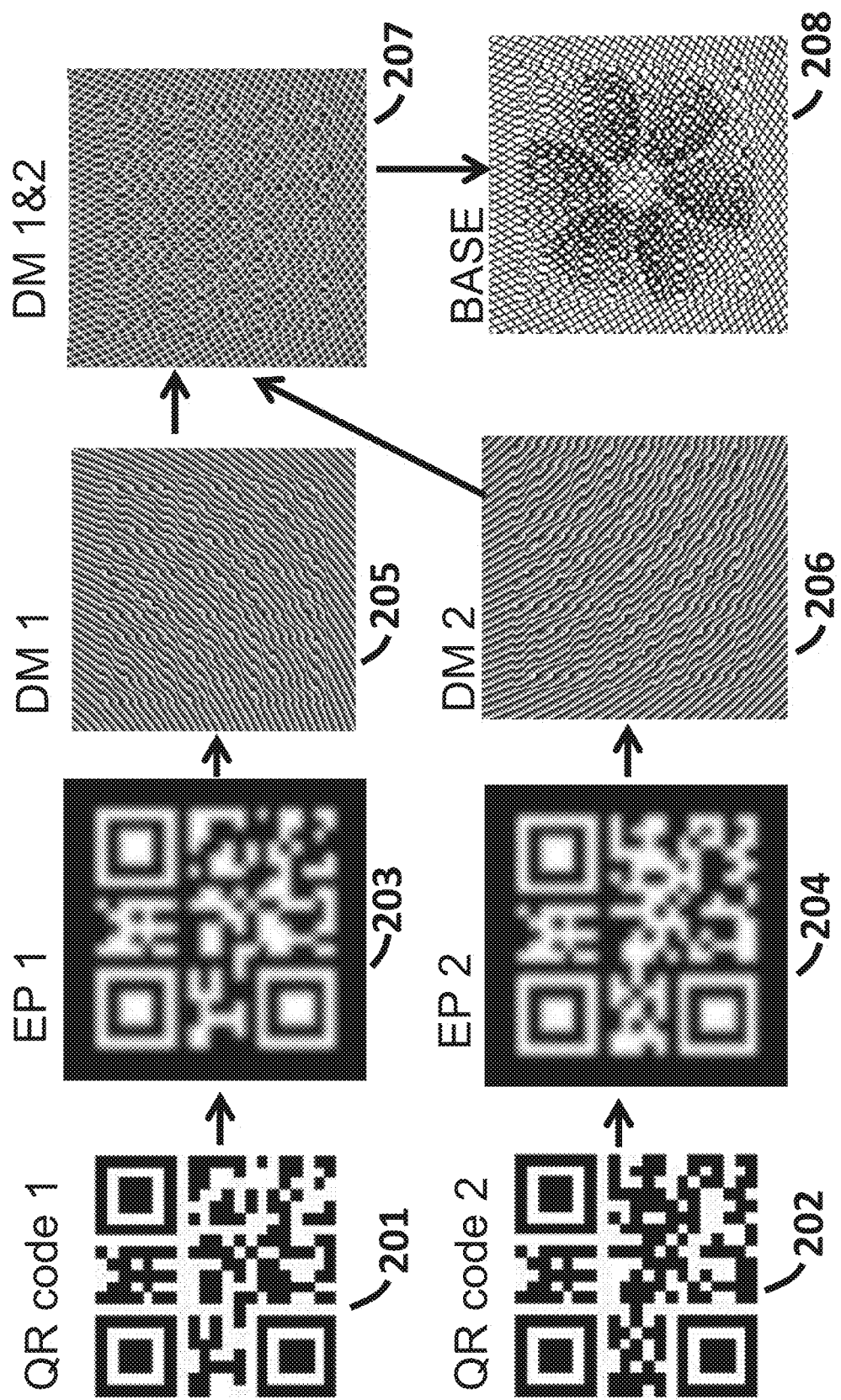
FIG. 2 shows elements of the processing steps starting from initial spatial codes (201, 202) and ending with the generated base layer multigrating (208)
Figure 4:
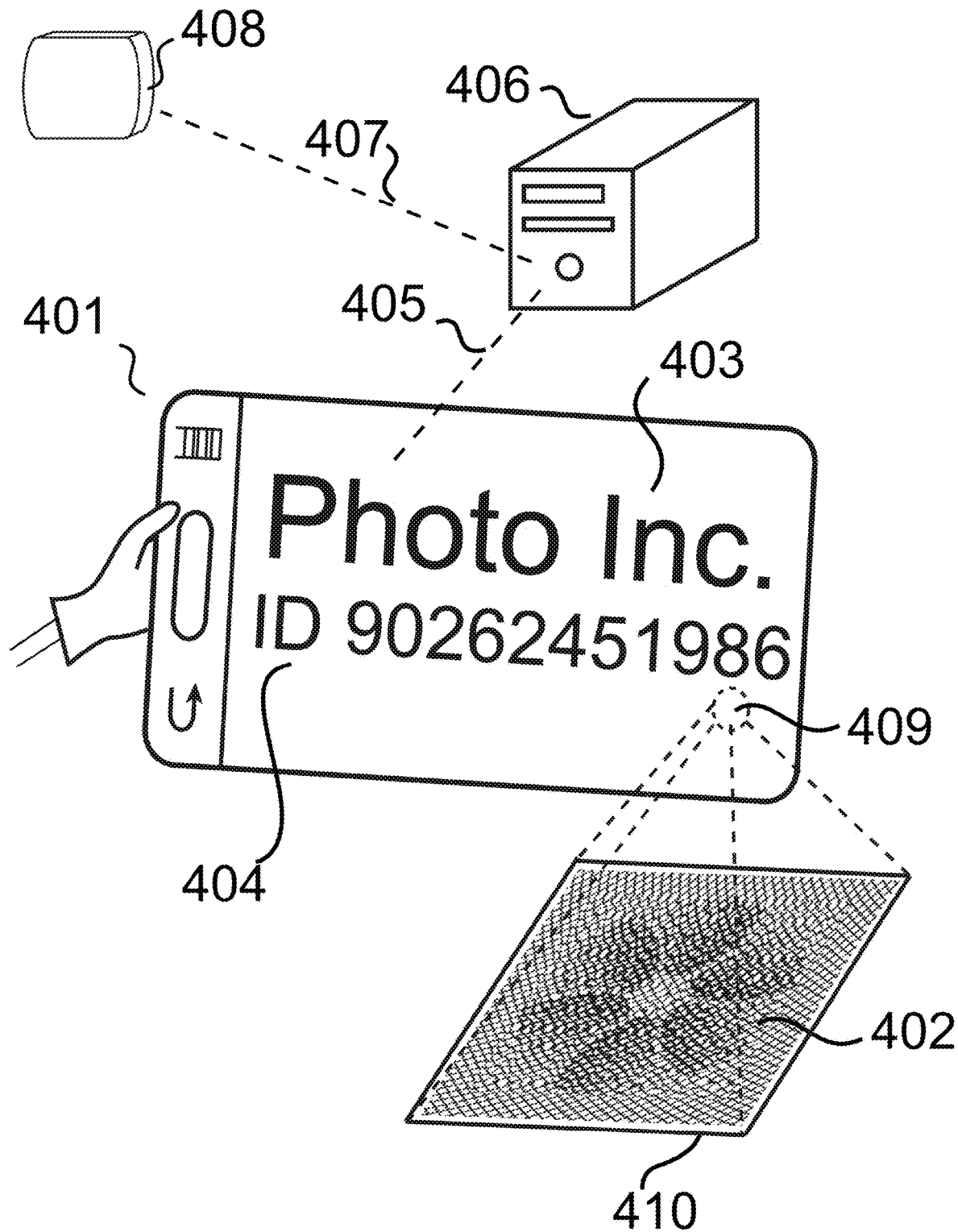
Figure 5A:
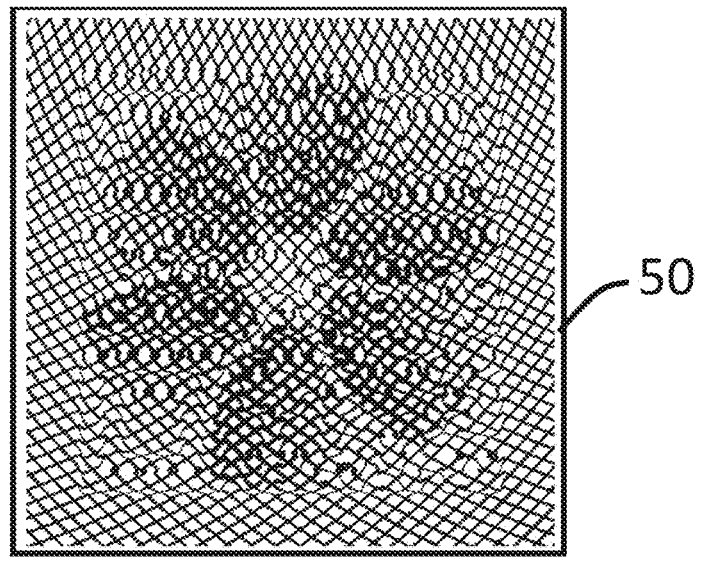
Figure 5B:
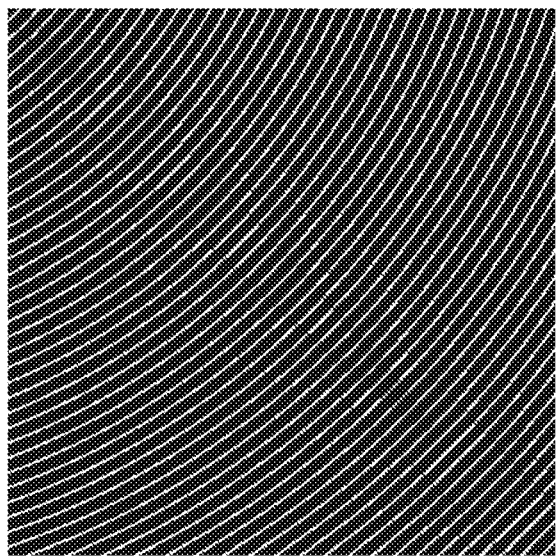
Figure 5C:
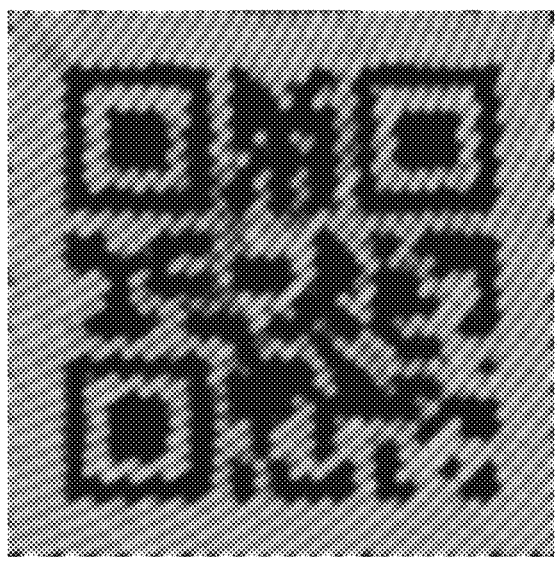
Figure 6A:
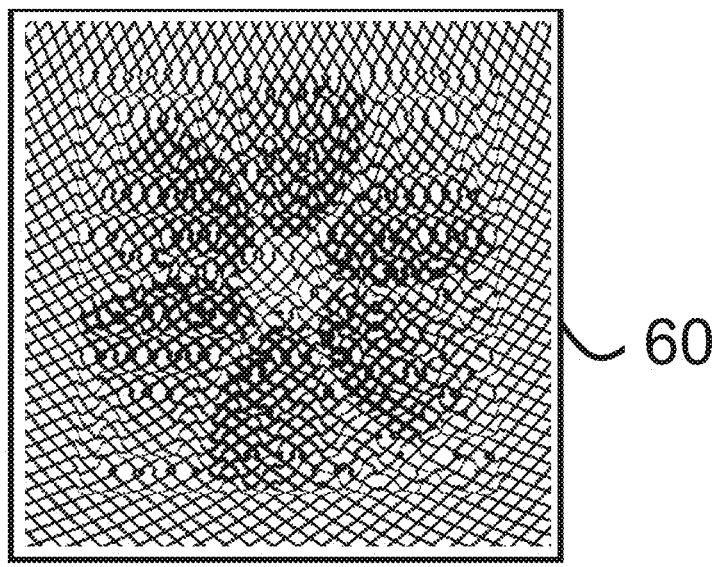
Figure 6B:
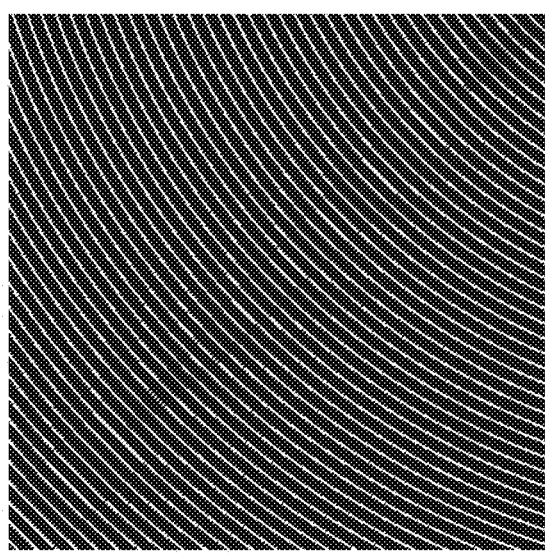
Figure 6C:
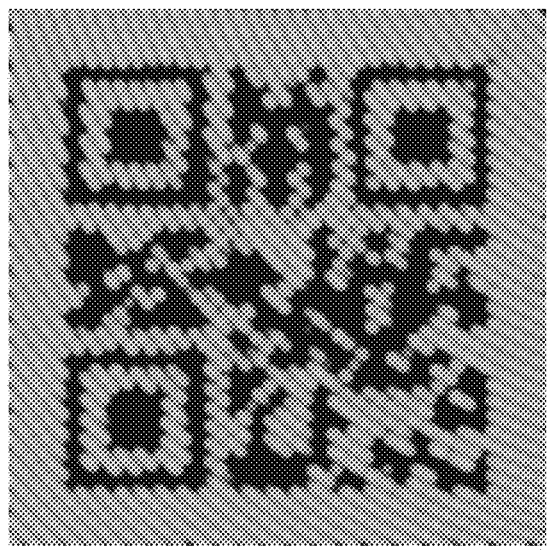
Figure 7A:
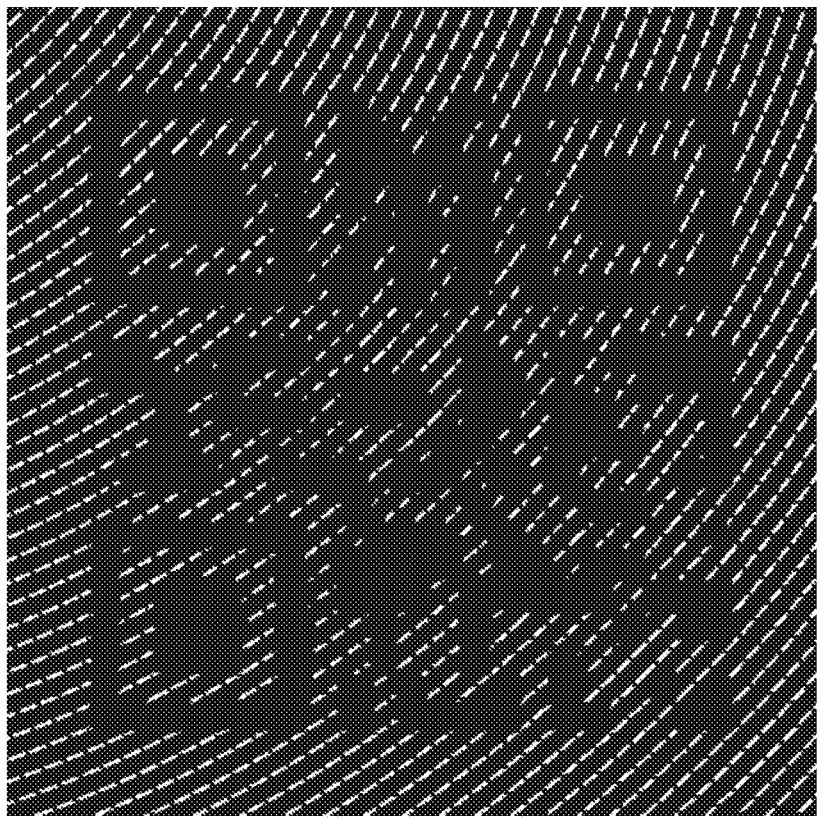
Figure 7B:
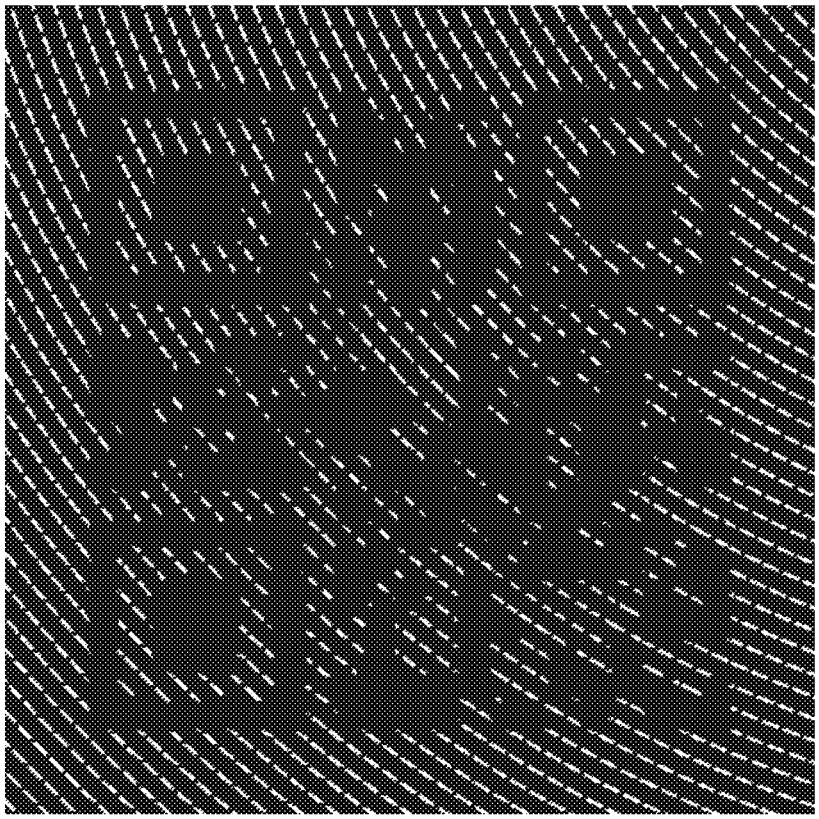
Figure 8A:
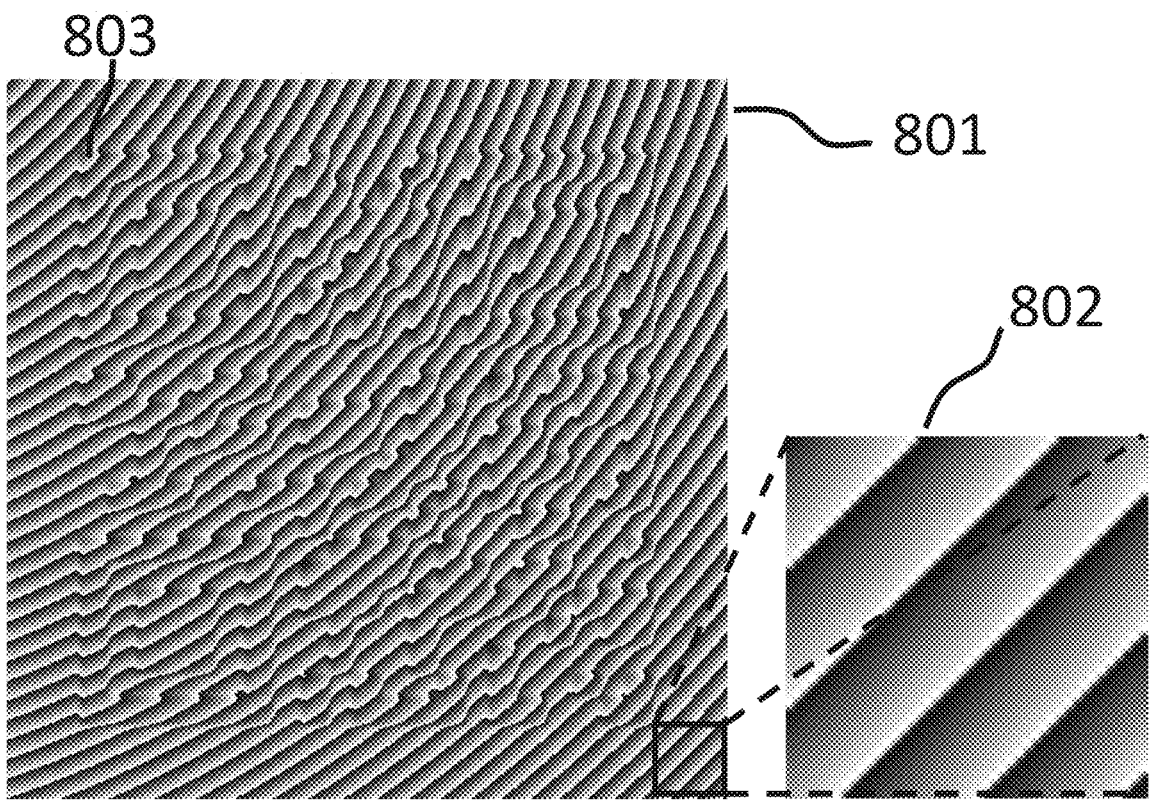
Figure 8B:
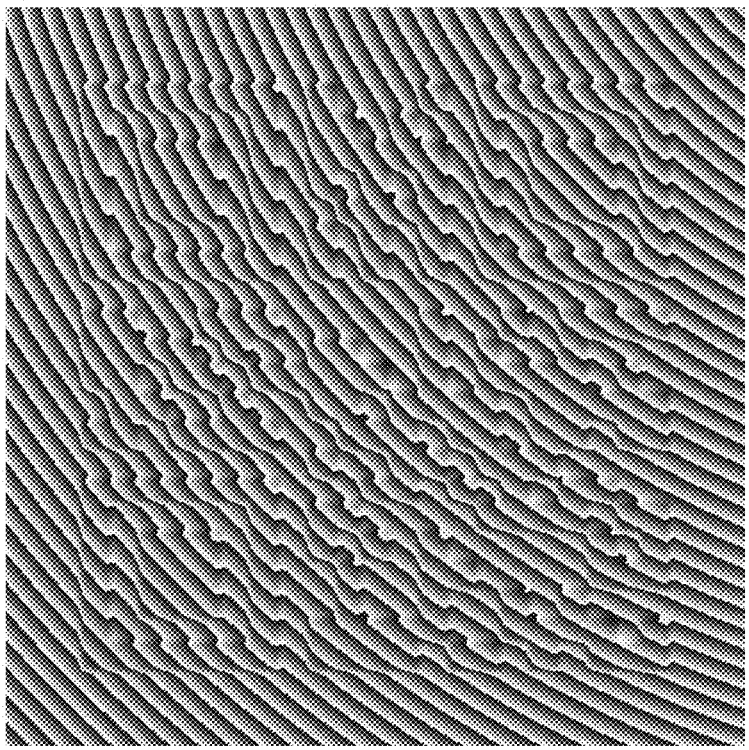
Figure 9A:
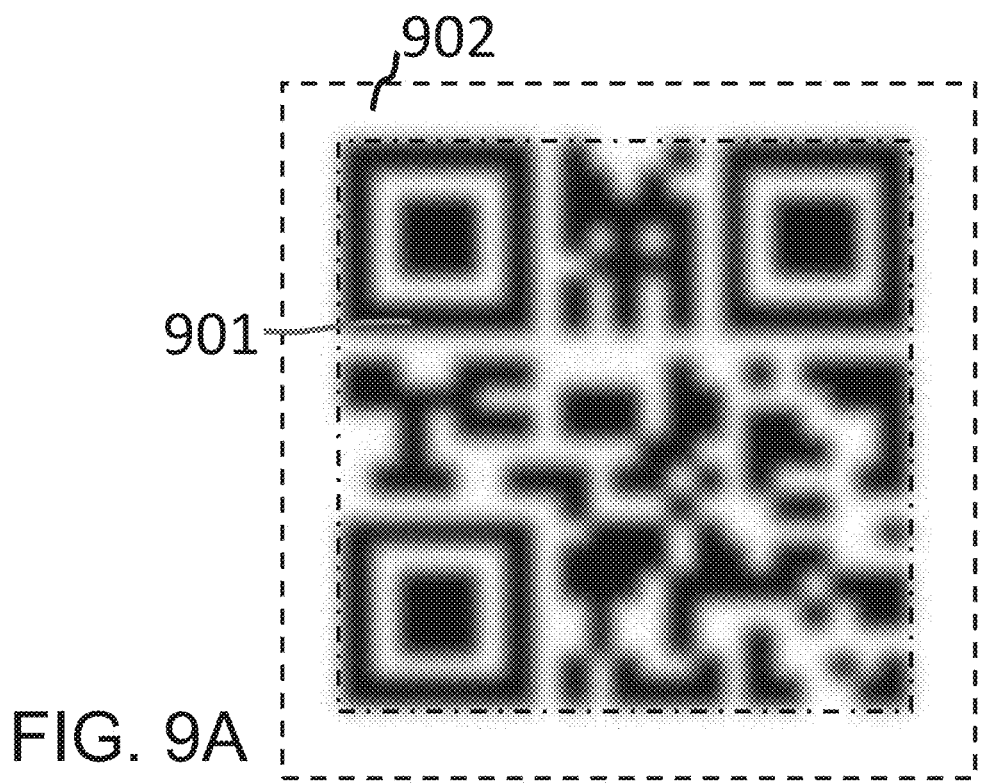
Figure 9B:
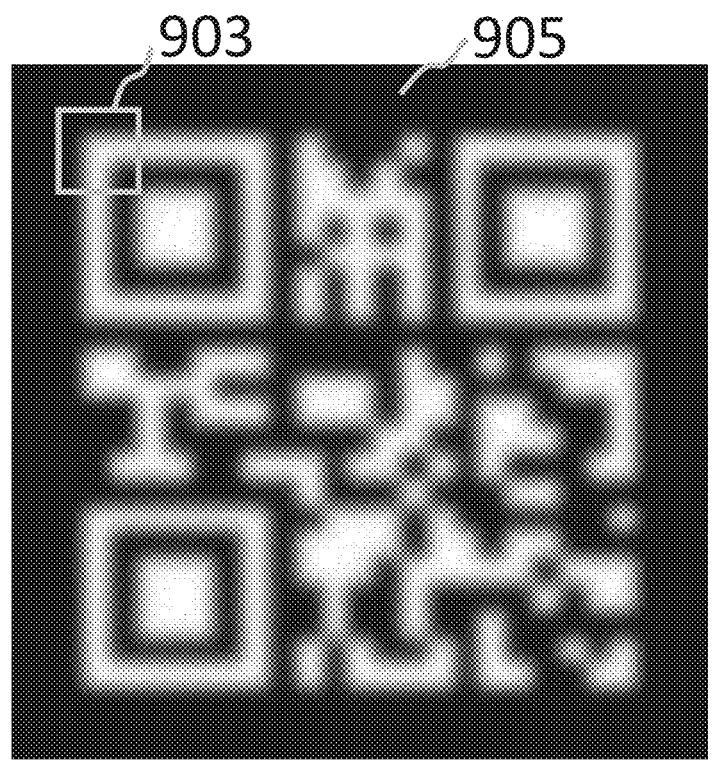
Figure 10:
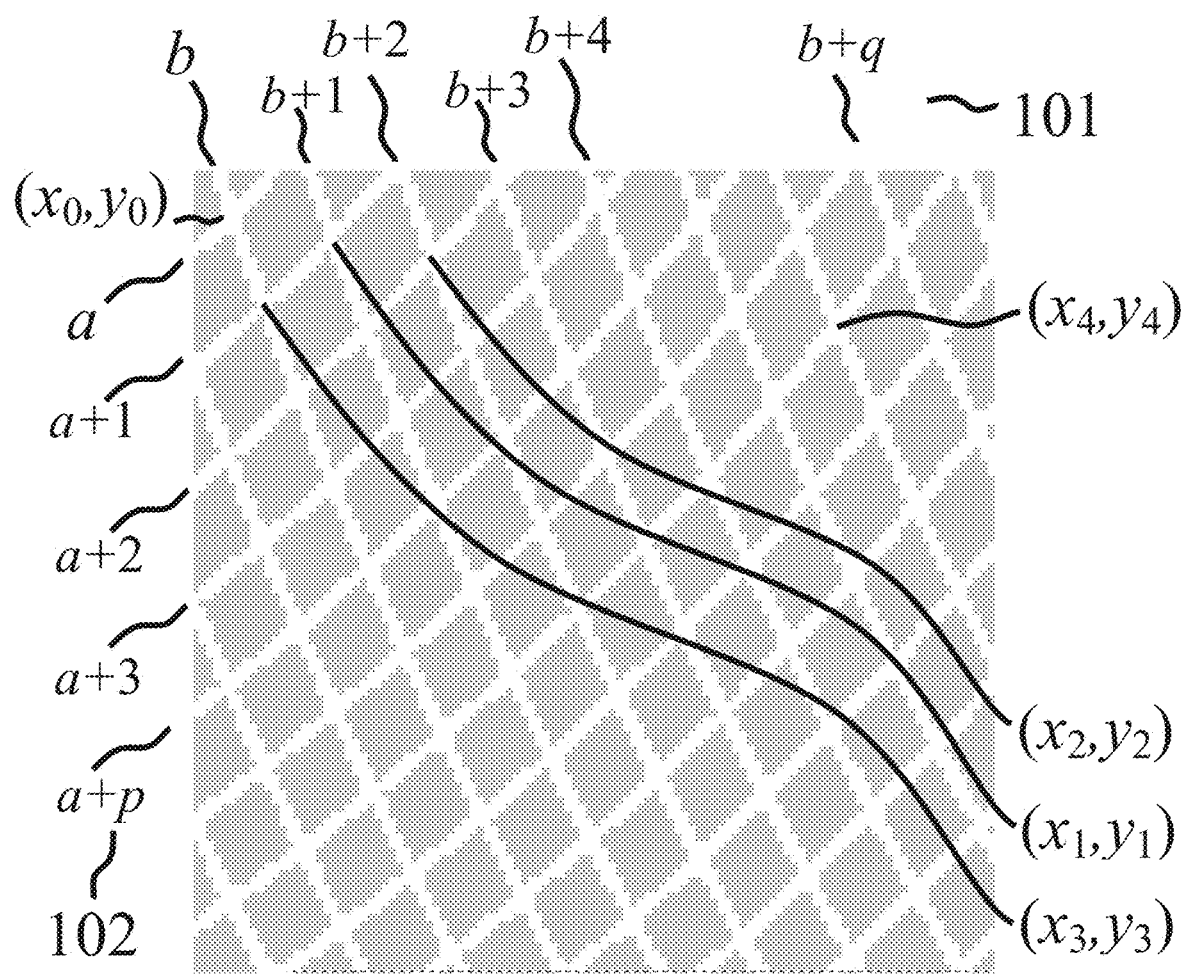
Figure 11:
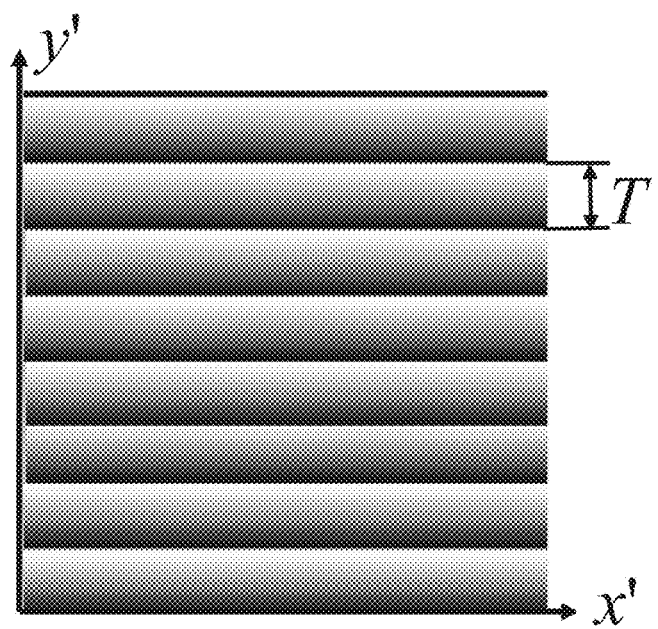
Figure 12A:
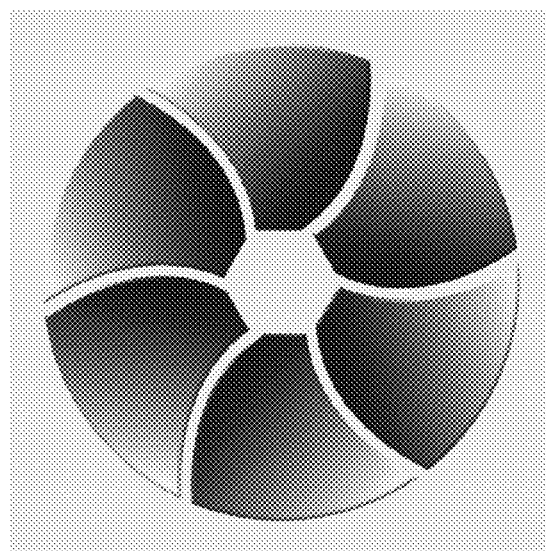
Figure 12B:
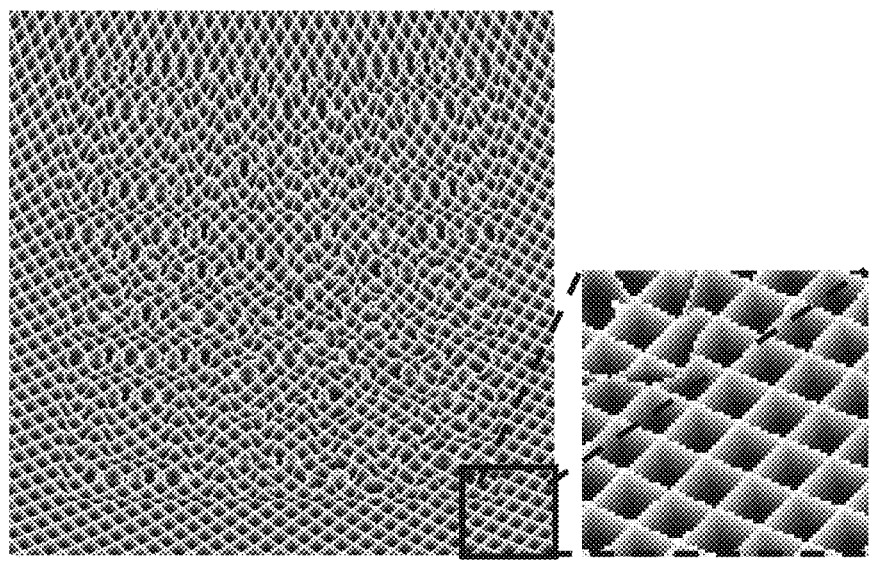
Figure 12C:
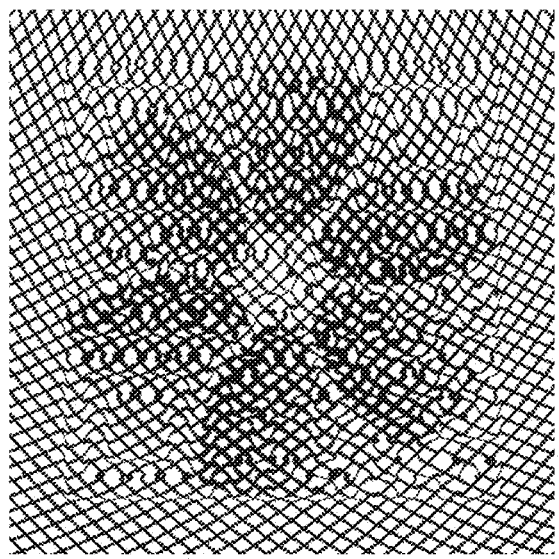
Figure 13A:
Figure 13B:
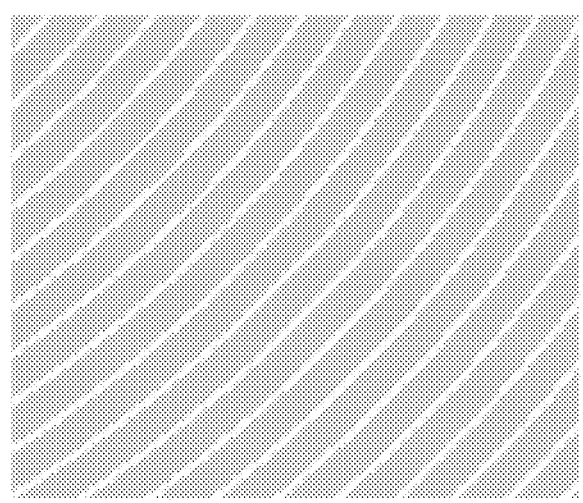
Figure 13C:
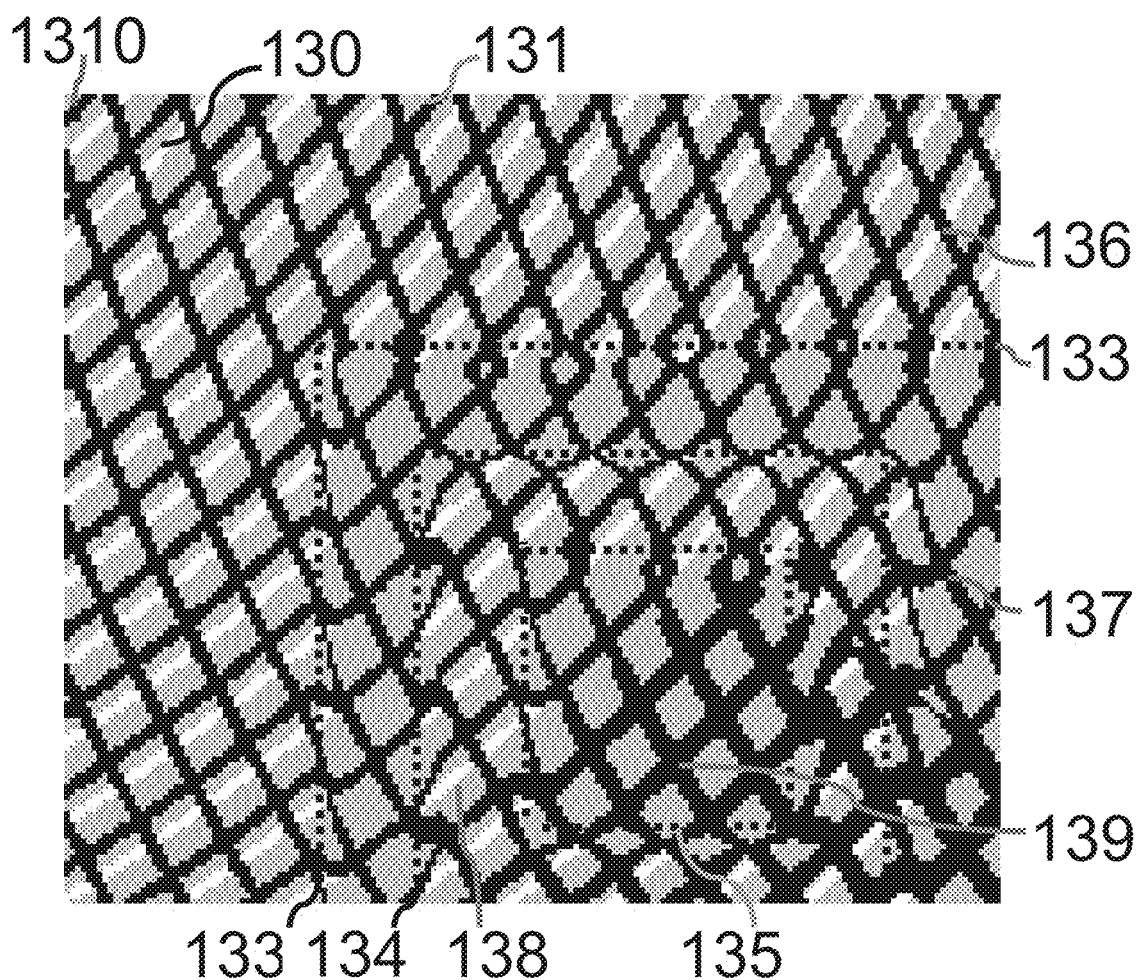
Figure 13D:
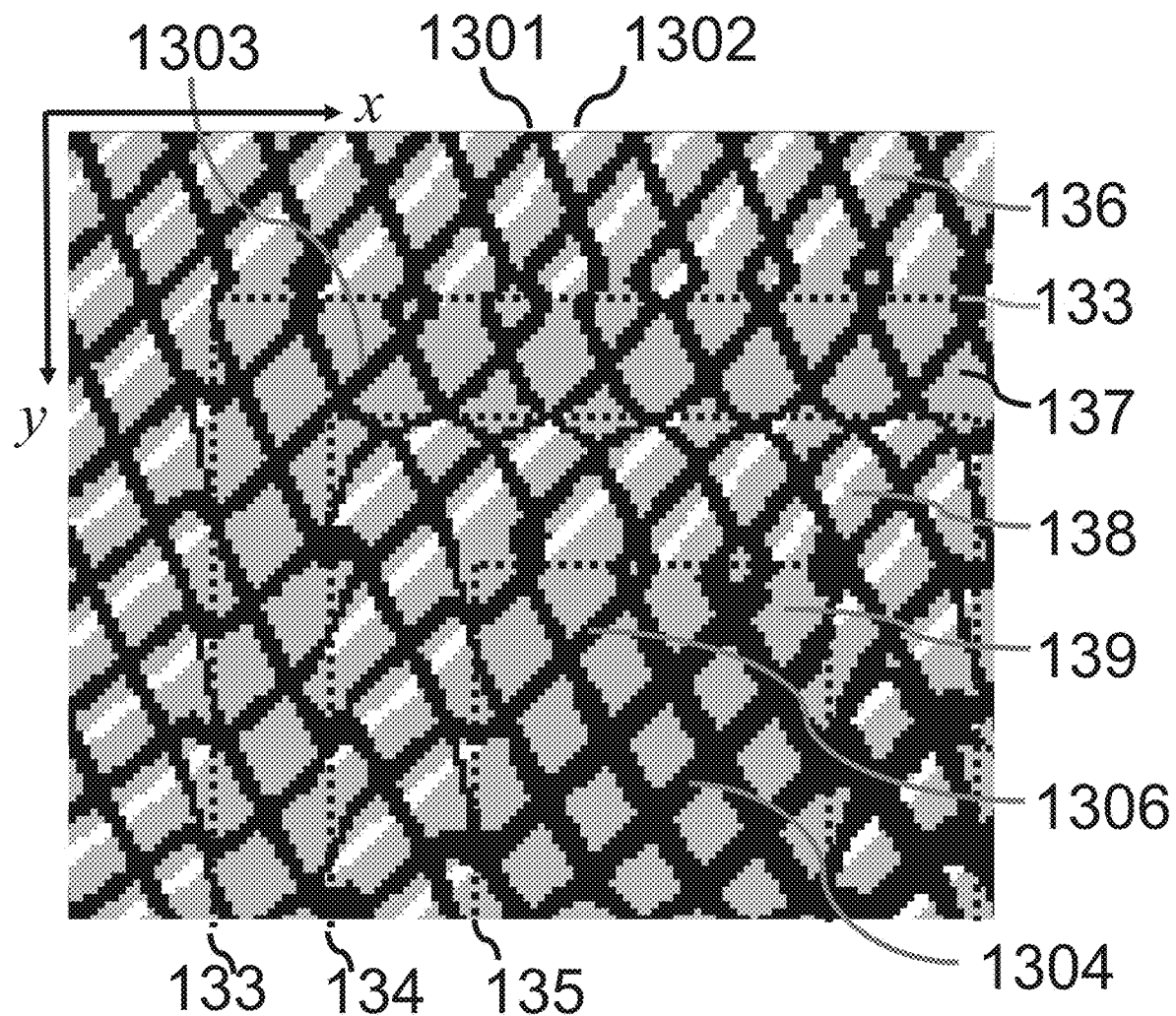
Figure 14:
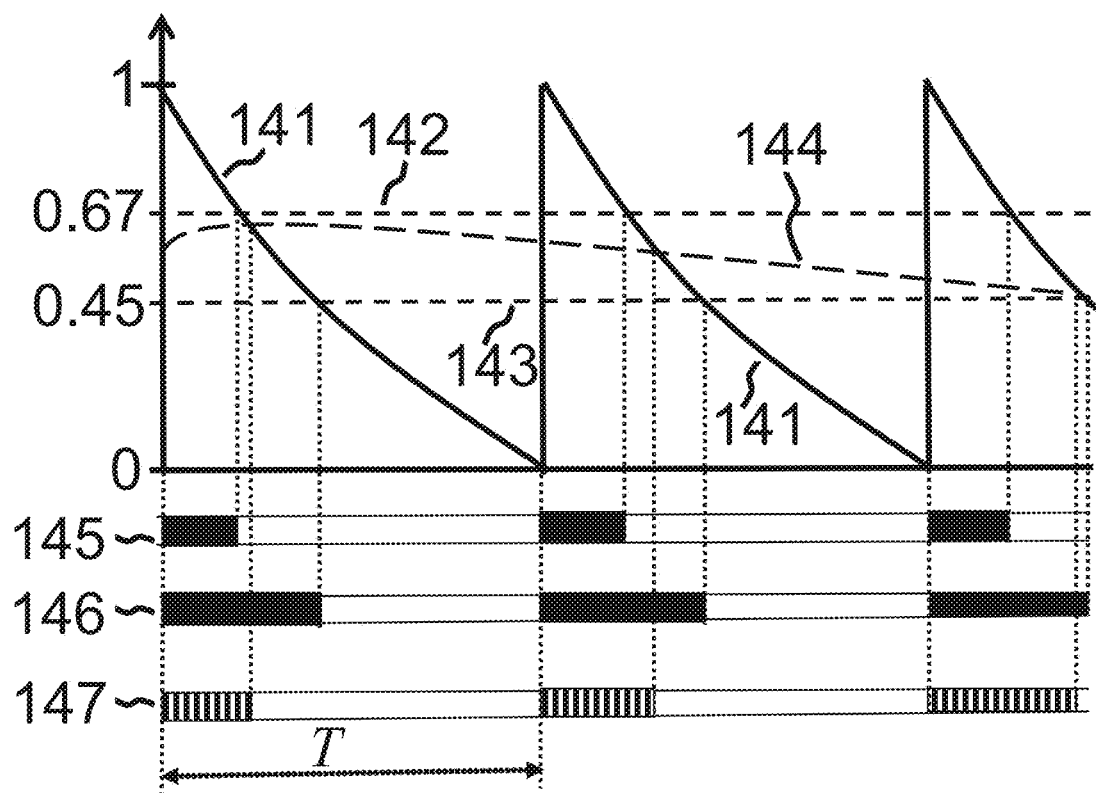
Figure 15:
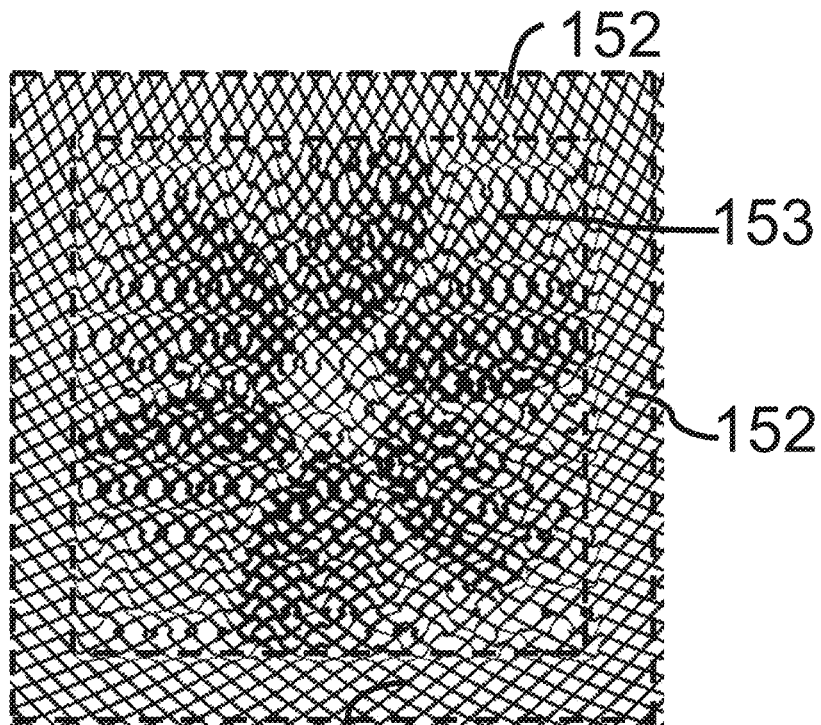
Figure 16:
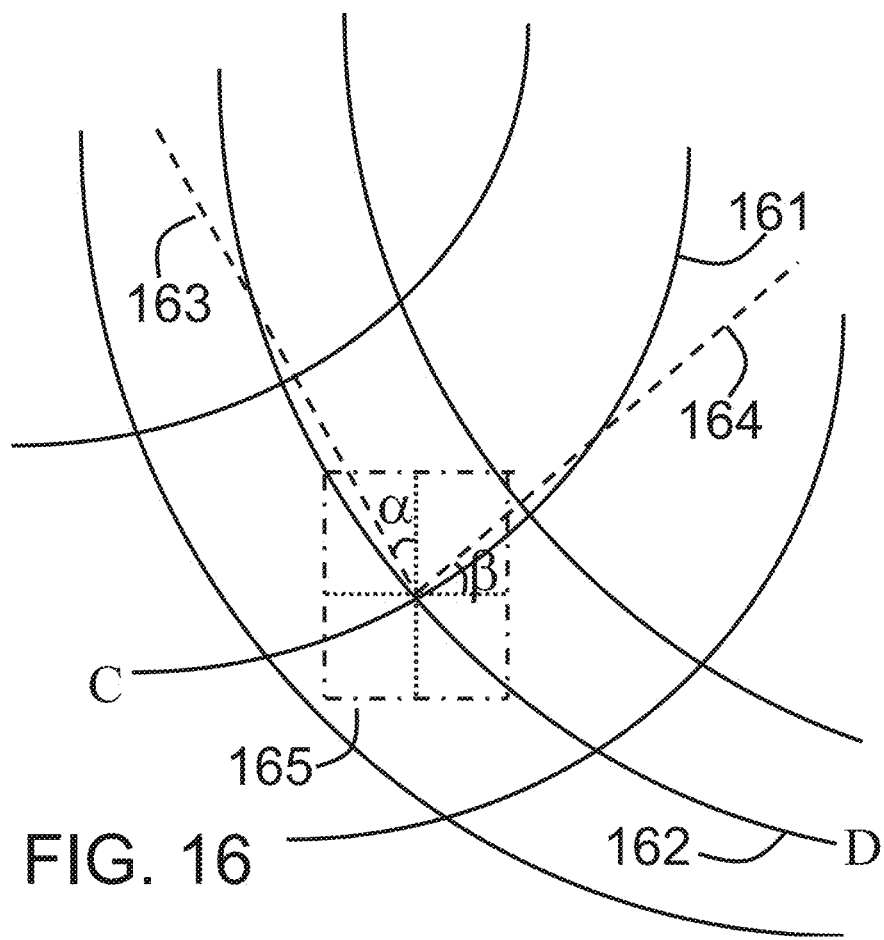
Figure 17:
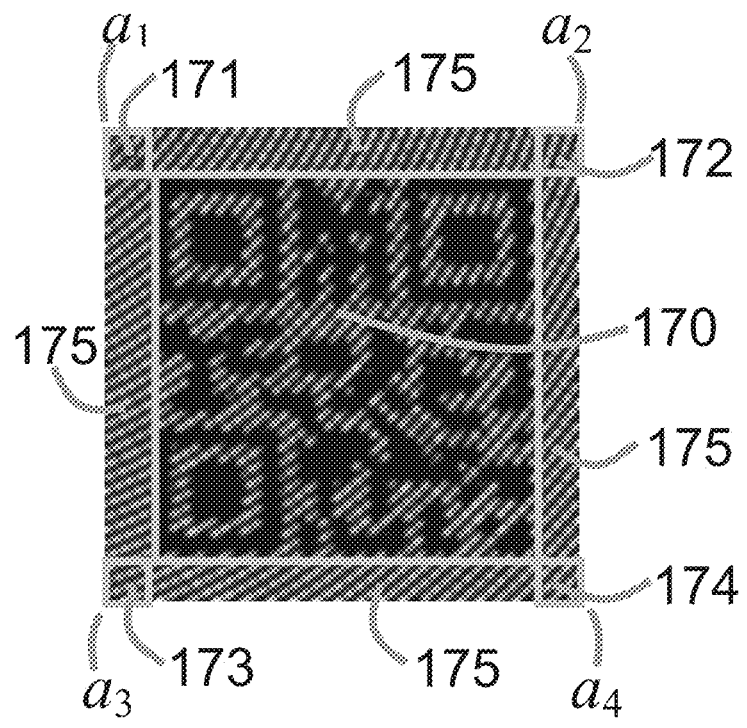
Figure 18:
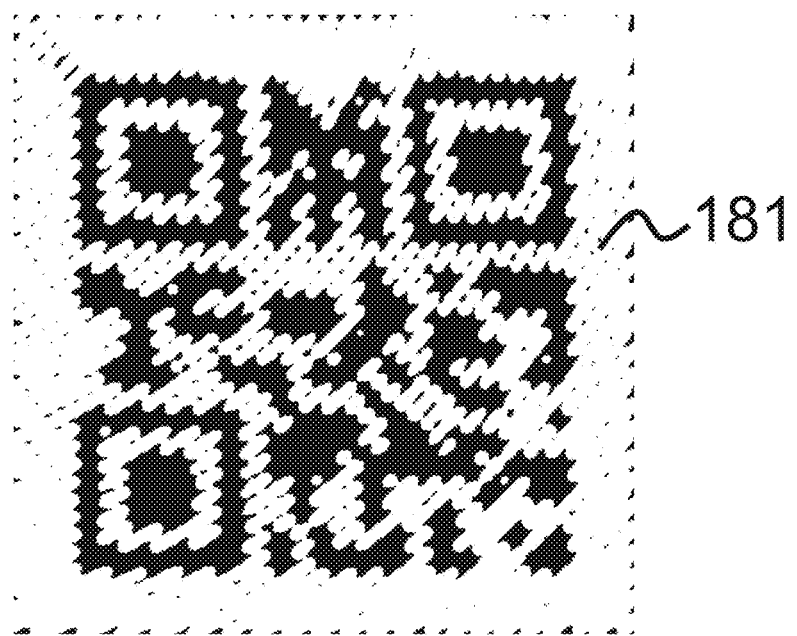
Figure 19:
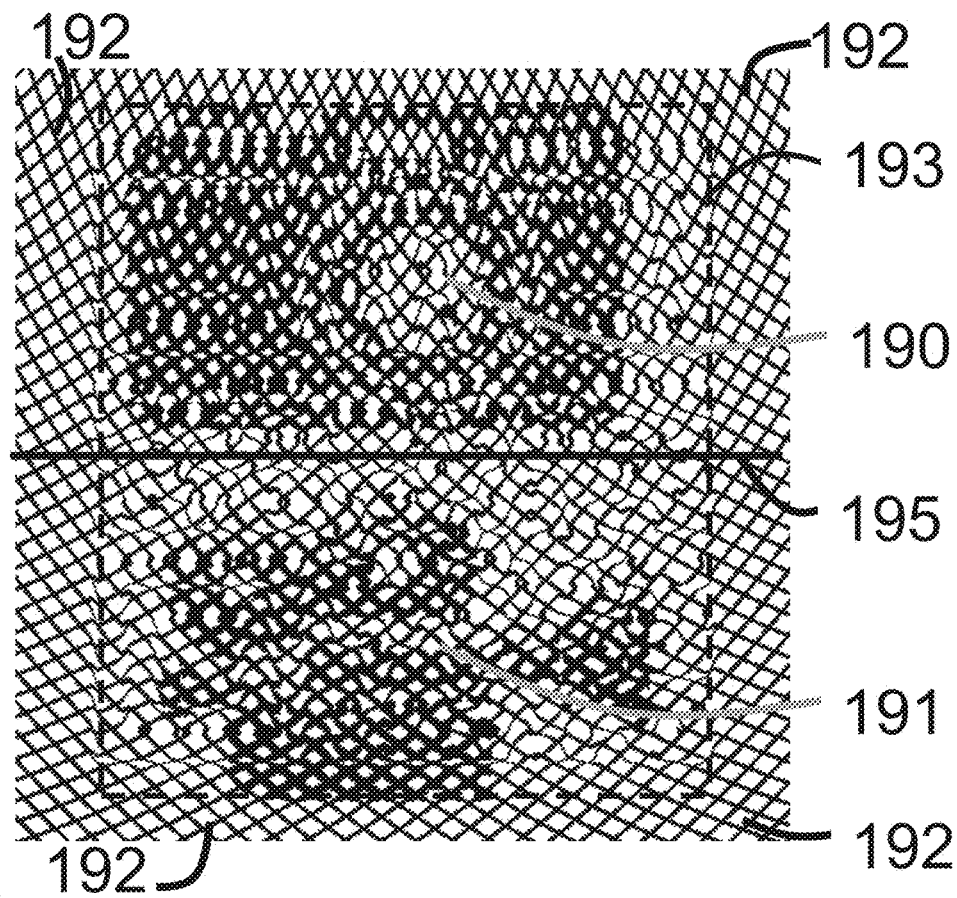
Figure 20:
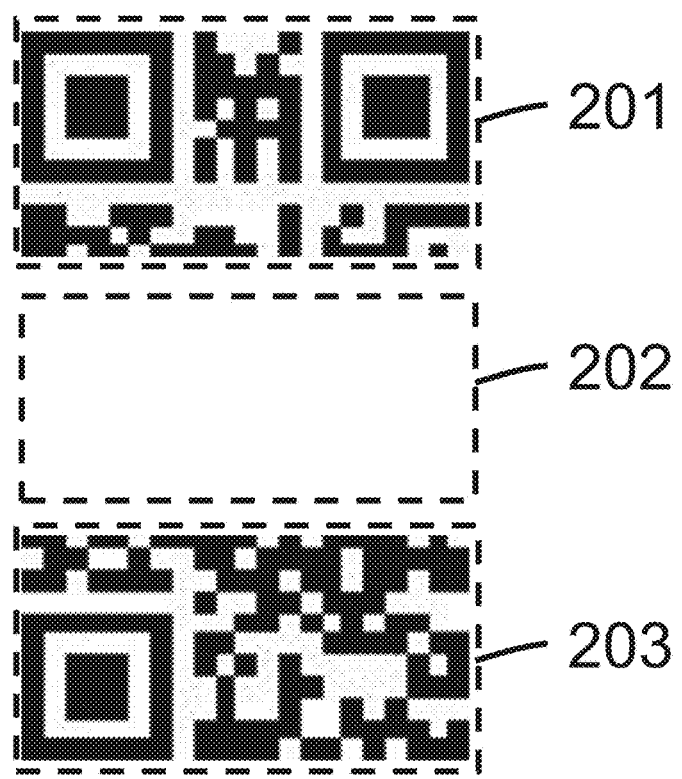
Figure 21:
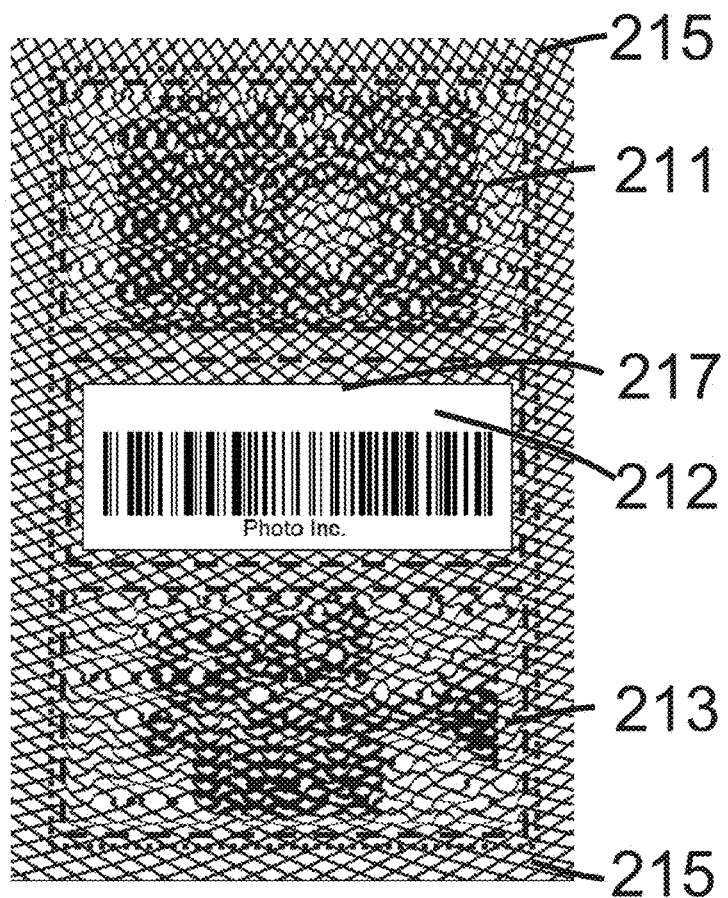
Figure 22:
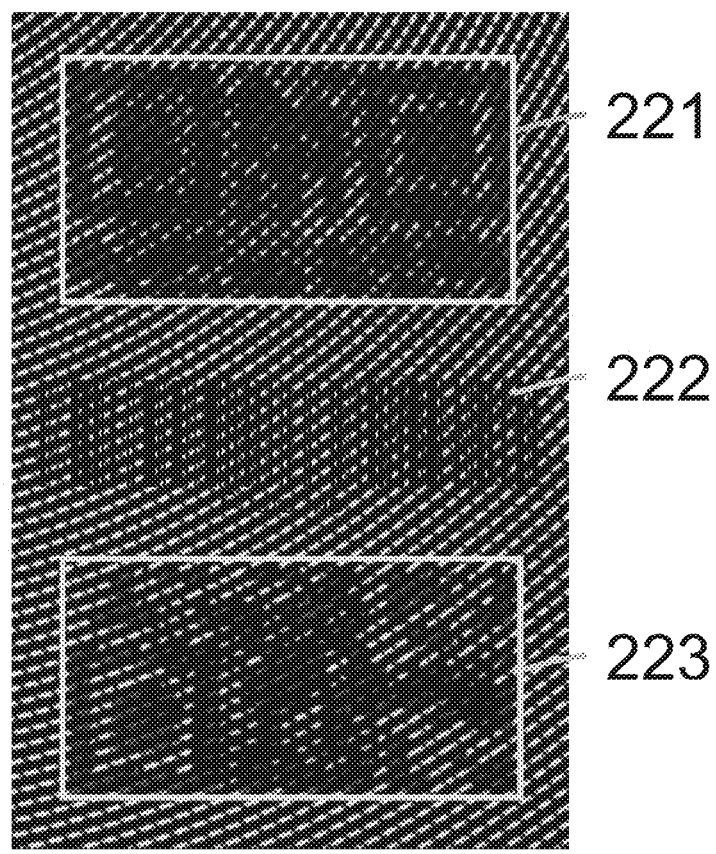
Figure 23:
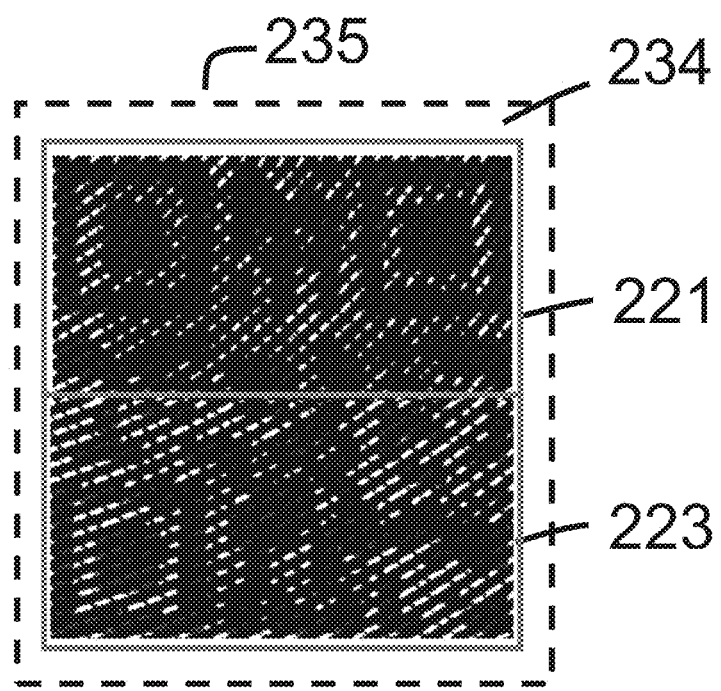
Figure 24:
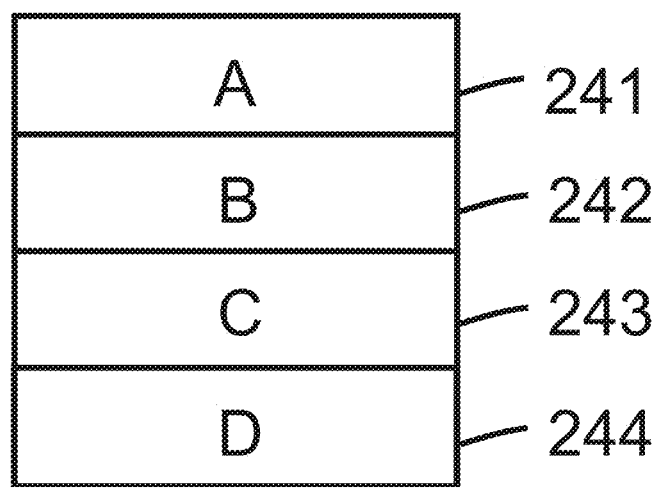
Figure 25:
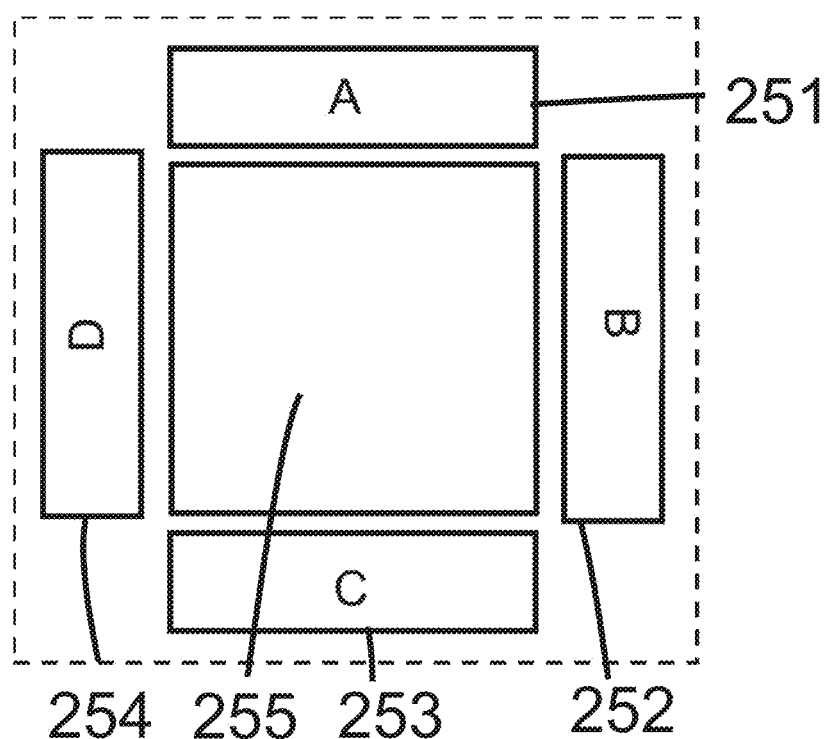
Figure 26A:
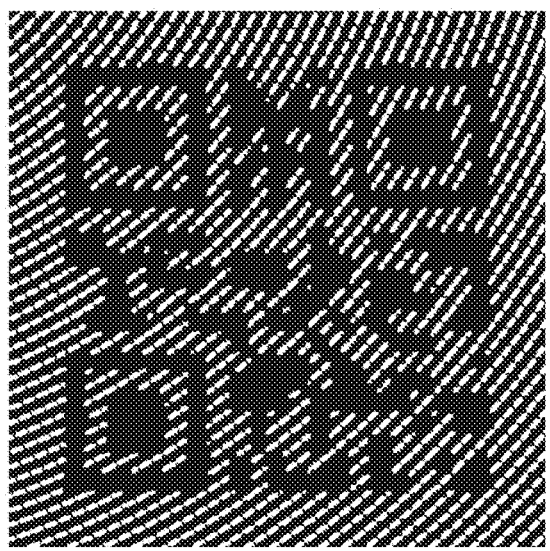
Figure 26B:
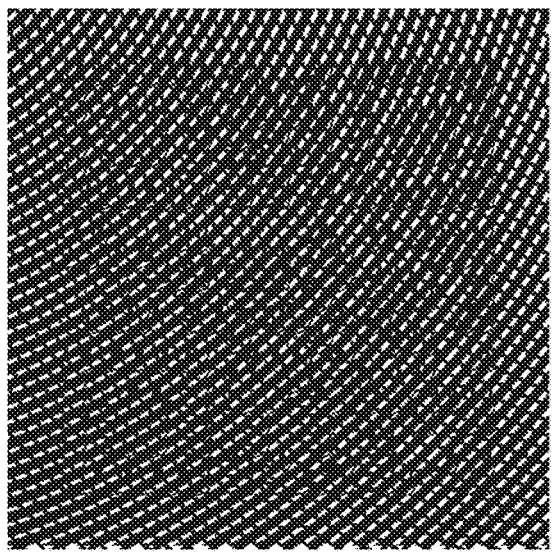
Figure 26C:
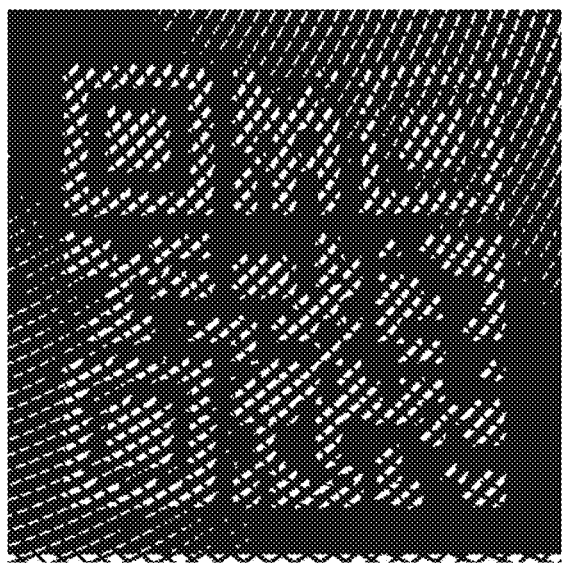
Figure 27:
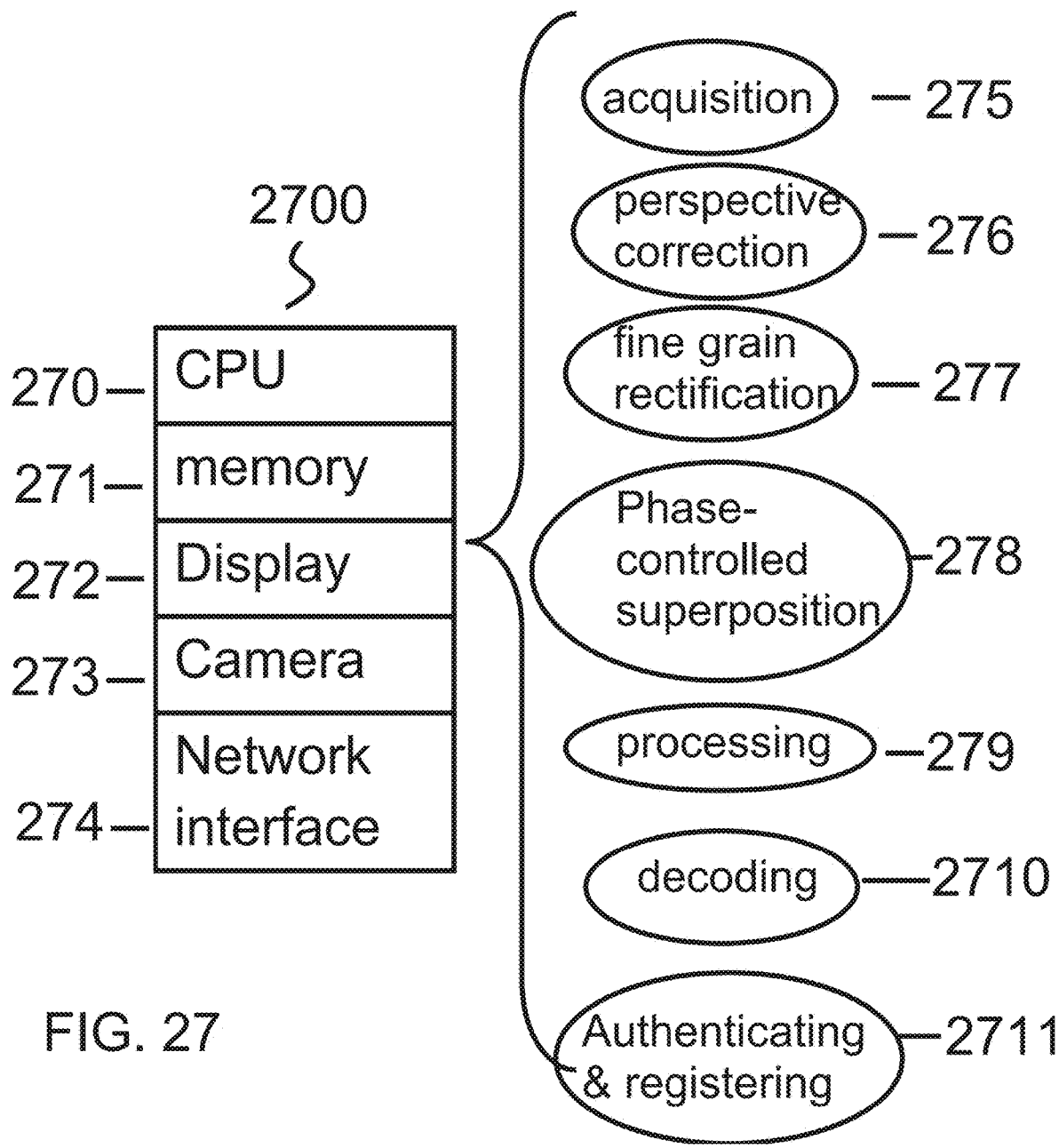
Figure 28A:
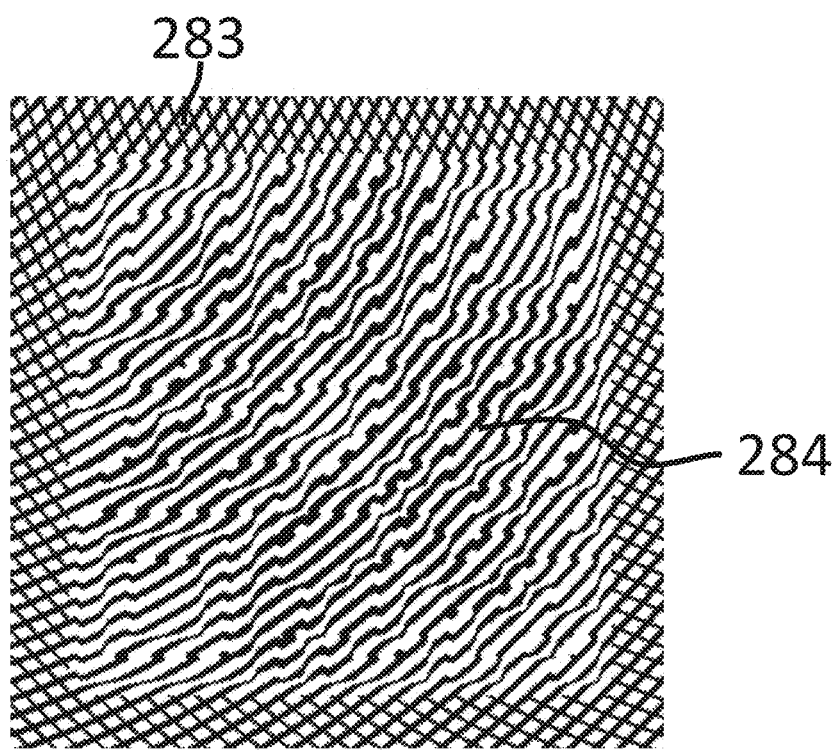
Figure 28B:
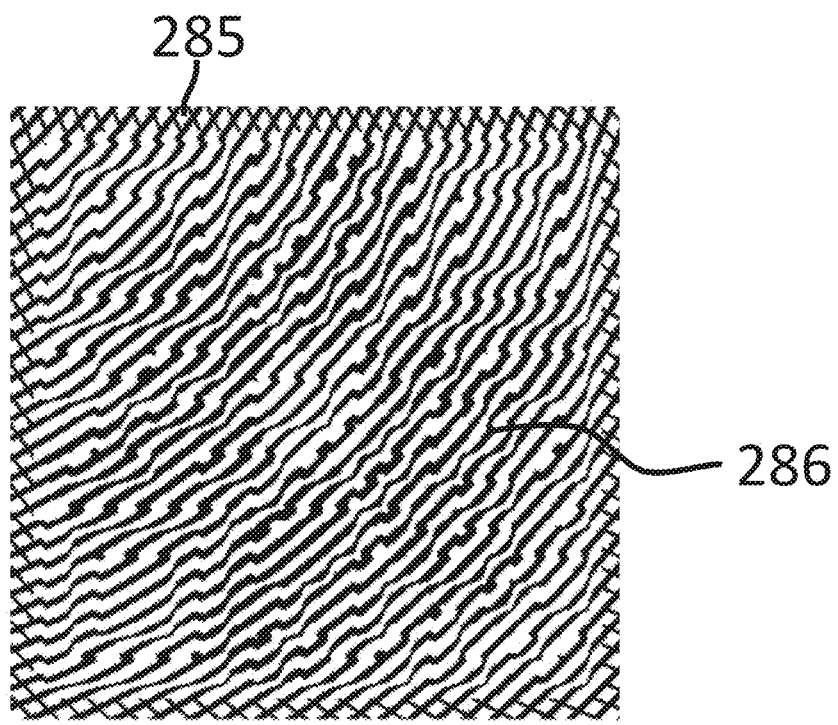
Figure 29:
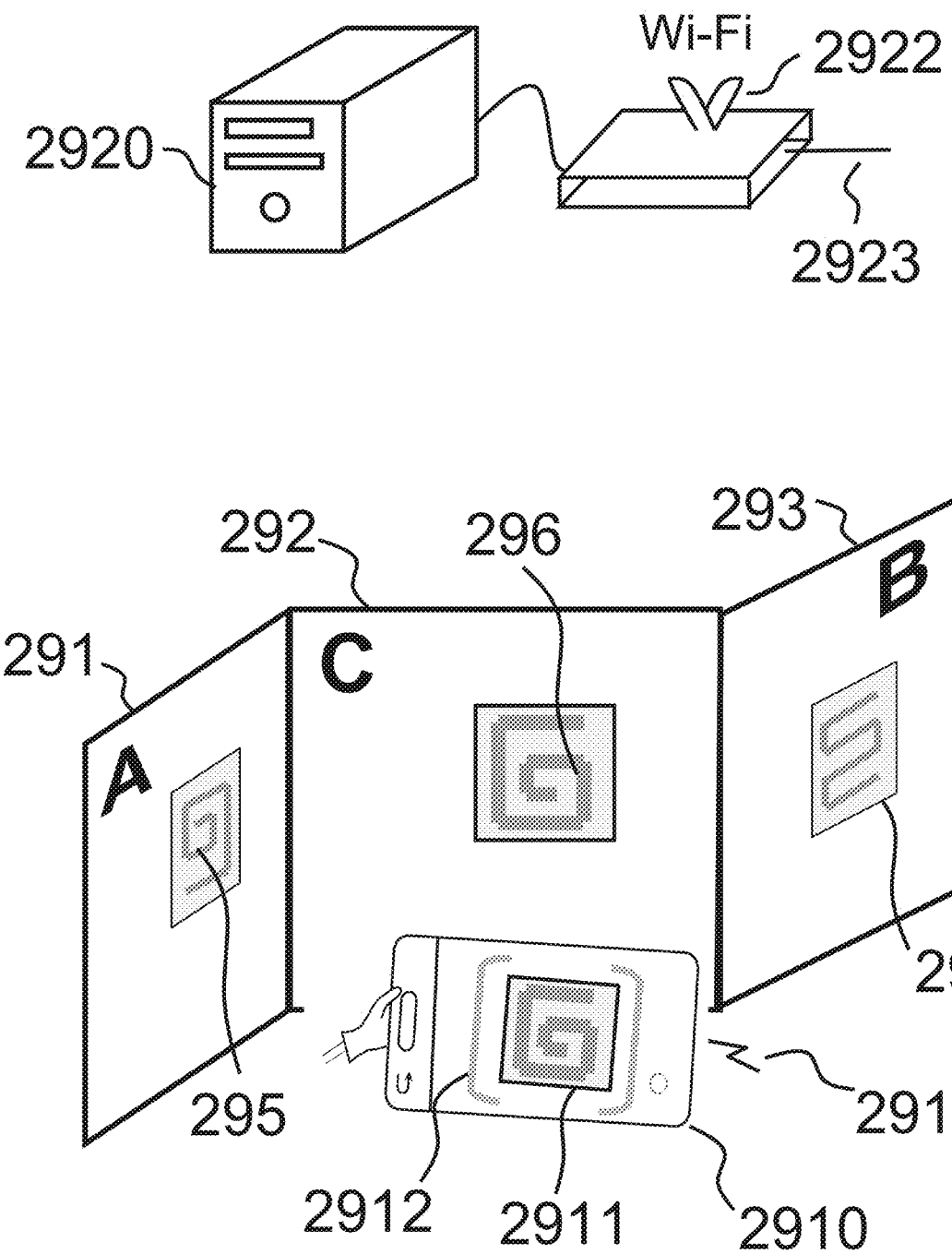

FIG. 4 shows a user holding in his hand a smartphone 401 which acquires a reproduced base layer multigrating 402 hiding a spatial code, processes it, decodes the corresponding information (403, 404) and sends it across the Internet to a server 406;

FIG. 5A shows a base layer multigrating hiding two spatial codes with a black rectangle 50 surrounding it;

FIG. 5B shows the first digital revealing layer grating having layout parameters matching the layout parameters of the first grating of the multigrating of FIG. 5A and capable of revealing the first hidden spatial code;

FIG. 5C shows the digital phase-controlled superposition of the multigrating of FIG. 5A and of the first digital revealing layer grating shown in FIG. 5B, after application of a low-pass filter and of a histogram modification operation;

FIG. 6A shows the same base layer multigrating as in FIG. 5A, with a black frame 60 surrounding it;

FIG. 6B shows the second digital revealing layer grating having layout parameters matching the layout parameters of the second grating of the multigrating of FIG. 6A and capable of revealing the second hidden spatial code;

FIG. 6C shows the digital phase-controlled superposition of the multigrating of FIG. 6A and of the second digital revealing layer grating shown in FIG. 6B, after application of a low-pass filter and of a histogram modification operation;

FIG. 7A shows the phase-controlled superposition of the base layer multigrating hiding two spatial codes and the first revealing layer grating;

FIG. 7B shows the phase-controlled superposition of the base layer multigrating hiding two spatial codes and the second revealing layer grating;

FIG. 8A shows a base layer dither grating hiding the first spatial code;

FIG. 8B shows a base layer dither grating hiding the second spatial code;

FIG. 9A shows a low-pass filtered spatial code (QR-code) with a white border frame 902 and an interior region 901;

FIG. 9B shows the inversion of the low-pass filtered spatial code shown in FIG. 9A, usable as elevation profile for generating the first base layer dither grating (DM1 in FIG. 2, 205);

FIG. 10 shows an example where two gratings of lines intersect each other and where from the location of a given intersection the locations of other intersections can be calculated;

FIG. 11 shows a horizontally laid out grating whose grating bands incorporate an intensity ramp (wedge);

FIG. 12A shows an original variable intensity image ("global image") representing as example a camera diaphragm that is to be rendered as base layer halftone multigrating;

FIG. 12B shows the inverted dither multigrating incorporating the combined first and second base layer dither gratings shown in FIGS. 8A and 8B, with the lower right part enlarged;

FIG. 12C shows the base layer multigrating appearing as a diaphragm halftone image resulting from dithering of the global image shown in FIG. 12A using the dither multigrating shown in FIG. 12B;

FIG. 13A shows an enlargement of the top-left part of the base layer multigrating of FIG. 12C;

FIG. 13B shows an enlargement of the same region as in FIG. 13A of the first revealing layer grating shown in FIG. 5B;

FIG. 13C shows in detail the superposition of the enlarged base layer multigrating shown in FIG. 13A and of the enlarged digital first revealing layer grating shown in FIG. 13B;

FIG. 13D shows an enlargement of part of the detailed superposition shown in FIG. 13C;

FIG. 14 shows a one dimensional representation of the dithering operation, where the intensity of an input signal 144 (from an original global image) is compared with the value of a dither function 141;

FIG. 15 shows the halftoned multigrating with its internal part 153 incorporating shifted grating lines and its external border frame 152 incorporating unshifted grating lines allowing fine grain rectification;

FIG. 16 shows the geometry of two intersecting gratings of lines and a kernel 165 used for locating the position of the actual intersections of these lines;

FIG. 17 shows the low pass-filtered phase-controlled superposition of the base layer multigrating and of the first digital revealing layer grating, with the corner regions 171, 172, 173, 174, the inside region 170 of the spatial code and the boundary region 175 of the spatial code;

FIG. 18 shows the decodable superposition image of FIG. 17, after low-pass filtering, histogram modification and thresholding;

FIG. 19 shows a base layer multigrating that was dithered with a global image that comprises two separate motives, a photo camera and a video camera;

FIG. 20 shows a spatial code divided into two parts 201 and 203, with a space 202 between them;

FIG. 21 shows the extended base layer multigrating hiding the two parts of the spatial code shown in FIG. 20, that has been dithered with an extended global image comprising two separate motives and that incorporates between its two multigrating parts 211 and 213 a visible object (e.g. a one-dimensional visible barcode) 212 as additional information item;

FIG. 22 shows the phase-controlled superposition of the extended base layer multigrating comprising a 1D barcode 212 as additional information item and of its first corresponding extended revealing layer grating;

FIG. 23 shows the superposed base and revealing layer gratings of FIG. 22, after extraction and reassembly of its internal parts 221 and 223;

FIG. 24 shows a partition of a spatial code into 4 parts labeled A (241), B (242), C (243) and D (244);

FIG. 25 shows as an example the four parts A, B, C and D laid out on the top 251, right 252, bottom 253, and left 254 of a visible object 255;

FIG. 26A shows the superposition of the base layer multigrating and the first revealing layer grating at a zero vertical displacement between the two layers;

FIG. 26B shows the superposition of the base layer multigrating and the digital first revealing layer grating at a relative vertical displacement of 3/12 the period T of the two layers;

FIG. 26C shows the superposition of the base layer multigrating and the digital first revealing layer grating at a relative vertical displacement of 7/12 the period T of the two layers;

FIG. 27 shows a smartphone 2700 comprising a CPU (270), memory (271), a touch screen display (272), a camera (273), a network interface (274), as well as software modules operable for acquisition (275) of a base layer multigrating hiding a spatial code, for perspective correction (276), for fine grain rectification (277), for phase-controlled superposition (278) of a perspectively corrected and rectified base layer multigrating and of a digital revealing layer grating, for processing (279) of the superposition in order to reveal the spatial code hidden within the multigrating, for decoding (2710) the spatial code, and for authenticating and registering it (2711);

FIG. 28A shows a variant of base layer multigrating, where the multigrating remains on the border frame 283 and where only one of the gratings 284 is created within the region inside the hidden spatial code;

FIG. 28B is the same multigrating variant as FIG. 28A, but with a much thinner border frame 285;

FIG. 29 shows a site with different locations A (291), C (292) and B (293), where pictures incorporating a base layer multigrating hang on the wall and where a person holding a smartphone 2910 performs the acquisition of one of these pictures, carries out the necessary to steps to decode the hidden message, sends it the server 2920 and receives from the server information about its present location (location C).

DESCRIPTION OF THE INVENTION

Before describing the specific method steps and processes making up the present invention, let us introduce the vocabulary as well as the principle underlying the synthesis of level-line moirés, as described by U.S. Pat. No. 7,305,105 and by the publication [Chosson and Hersch 2014], see bibliographic citation at the end of the present specification.

Vocabulary and General Explanations

We use the term "message" or "recognizable message" for the message that is encoded by the spatial code hidden into a base layer multigrating and revealed by the superposition of the acquired base layer multigrating and a corresponding digital revealing layer grating. "Recognizable" means that either a human being, a smartphone or a computing system is capable of recognizing the message, being it a string of alphanumerical symbols such as a number, being it a 1D or 2D barcode, or being it a QR-code.

The term spatial code is a general term for all possible variations of 2D codes, 2D barcodes, 1D codes or arrangements of alphanumeric characters that can be represented within a 2D surface, for example an Aztec code, a data matrix code, a QR-code, a barcode or an alphanumeric string.

We use the term "smartphone" for a mobile computing device (e.g. FIG. 4, 401), incorporating a camera 409 and possibly being connected 405 to a computing server 406 for information exchange. Commercially available tablets or laptop computers are also mobile devices that may perform the same actions as a smartphone.

We use the terms "captured multigrating", "captured multigrating image", "acquired multigrating" and "acquired multigrating image" interchangeably. They indicate that the multigrating is obtained by taking a picture with the camera of the mobile device.

Where nothing else is specified, the x-axis of the coordinate system points to the right and the y-axis points downwards, see for example the coordinate axes x and y in FIG. 13D.

We use the terms "base dither grating(s)" and "dither base grating(s)" interchangeably. We also use the terms elevation profile and elevation function interchangeably.

A grating or an elevation profile $H(x,y)$ is defined as a 2D image formed of pixels at positions $(x,y)$ with intensities between 0 (black) and 1 (white). Inverting a grating or an elevation profile means carrying out the operation $H(x,y)'=1-H(x,y)$.

The terms line grating, grating of lines, level lines and family of lines represent geometric objects having the same layout properties. The term "dither bands" is used instead of the term "lines" in the case of a base layer grating forming a dither grating (e.g. FIG. 2, 205, or FIG. 8A) or a dither multigrating (FIG. 12B) that is used for subsequent dithering, i.e. for generating a halftone made of a grating of lines (FIG. 12C). The base layer dither bands (FIG. 12B) and the corresponding base layer halftoned lines (FIG. 12C) have the same geometric layout and are described by the same implicit equation with in addition the same shift that is a function of the elevation profile $G(x,y)$. A base layer dither multigrating (e.g. FIG. 2, 207) is the combination, pixel by pixel, of two base layer dither band gratings (e.g. 205 and 206).

The term "repetition period T" or simply "period T" is the actual period of a line grating in case of a horizontal grating. In case of a curvilinear grating, it is related to the spacing between consecutive lines of the family of lines forming the grating.

The term "phase" characterizes the position of the family of lines within a grating. At a phase of zero, the lines are at their initial position and are described as a family of level lines of implicit equation $Q(x,y)=k\,T$. At a fractional phase of $f$ (or: "at a phase shift of $f$") the previous level lines associated to index k are replaced by the level lines associated to $k+f$ having the line family implicit equation $Q(x,y)=(k+f)\,T$.

When printed on paper, a base layer multigrating shows active black or colored lines on top of a white background. However, when reproduced on metal by engraving or etching, the engraved base layer multigrating may show instead of active black lines active bright lines, also called high-intensity lines and instead of the white background and dark background. In such a case, the superposition with show originally black spatial elements as bright and originally white background elements as dark. The resulting extracted spatial code is inverted, when compared with the original spatial code.

The terms "phase displacement", "superposition phase" or "relative phase" characterize the phase of the superposition between a base layer grating and a revealing layer grating. A superposition phase of zero means that the two gratings are superposed without displacement of the family of lines forming one grating in respect to the family of lines forming the other grating. A superposition phase of a fractional value f means that the lines of one grating (i.e. the level lines) are displaced by a fraction f of their period T in respect to the other layer. These displacements are defined by the family of line equations $Q(x,y)=(k+f)T$. For example, at a phase of 0.5, the lines of one layer are displaced by half a period in respect to the other layer. For a circular grating of lines, the displacements are in the radial direction.

The terms "global image" and "original variable intensity image" are used interchangeably. They represent the grayscale image that is to be dithered (i.e. halftoned) with the base layer dither multigrating. The result of the dithering operation is the base layer multigrating incorporating black lines on a white background or bright lines on a dark background.

"Corresponding base and revealing layer gratings" are matching pairs of base and revealing layer gratings, i.e. gratings that have substantially the same repetition period T and the same layout parameters specified by the fundamental geometric transformation function $Q(x,y)$, see Section "The principle of level-line moirés". For example, in the case of a circular layout, both the base and revealing layer gratings have the same radial period T and the same center $(c_x, c_y)$ of their circular line segments.

The term "spatial code superposition" means the superposition of a multigrating hiding a spatial code and of a corresponding revealing layer grating.

An "apparently variable gray image or "apparently variable intensity image" is a halftone image and therefore bi-level, but which from a normal viewing distance appears as a variable gray or a variable intensity image.

The border frame of a spatial code is the generally white border (FIG. 9, 902) surrounding its inside region formed by small adjacent black and white areas (FIG. 9, 901). This inside region is also called "active region" or "active area".

Note that a spatial code can be decoded when having approximately the intensities of a standard printed spatial code. Many decoding libraries are able to decode a spatial code when it is inverted, i.e. with originally white regions being dark and originally black regions being bright.

The Principle of Level-Line Moirés

The principles of level-line moirés have been disclosed in patent "Level-line moiré" (U.S. Pat. No. 7,305,105) and in [Chosson and Hersch 2014]. These publications teach how to create a moiré representing a freely chosen recognizable shape as a superposition of two line gratings, a base layer line grating and a revealing layer line grating whose respective geometric layouts obey specific rules. Level line moirés rely on the principle stating that the level lines of an elevation profile appear as moiré lines in the superposition of a base layer embodied by a line grating whose lines are shifted by an amount substantially proportional to the elevation and of a revealing layer embodied by the unshifted line grating. The bilevel shape that represents the outline of the desired moiré shape is converted into an elevation profile. This elevation profile is conceived with the goal of producing strong intensity or color variations at the shape boundaries and of incorporating level lines that yield shapes similar to the original bilevel shape. The elevation profile level lines are revealed as moiré when superposing the revealing line sampling grating on top of the synthesized base layer line grating incorporating the spatially dependent line shifts.

With the known concept of indicial equations, one deduces in a very simple manner the curvilinear moiré fringes resulting from the superposition of a curvilinear base layer line grating e.g. printed on a sheet of paper and a possibly curvilinear revealing layer line grating, printed on a transparency.

Figure 1A:
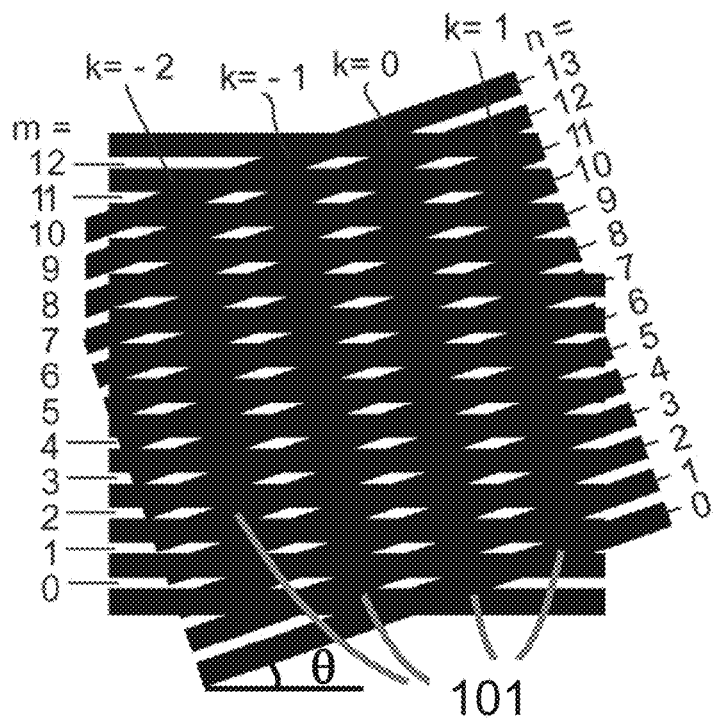
FIG. 1A shows two superposed rectilinear gratings and the moiré fringe lines 101 resulting from the superposition.
Figure 1B:
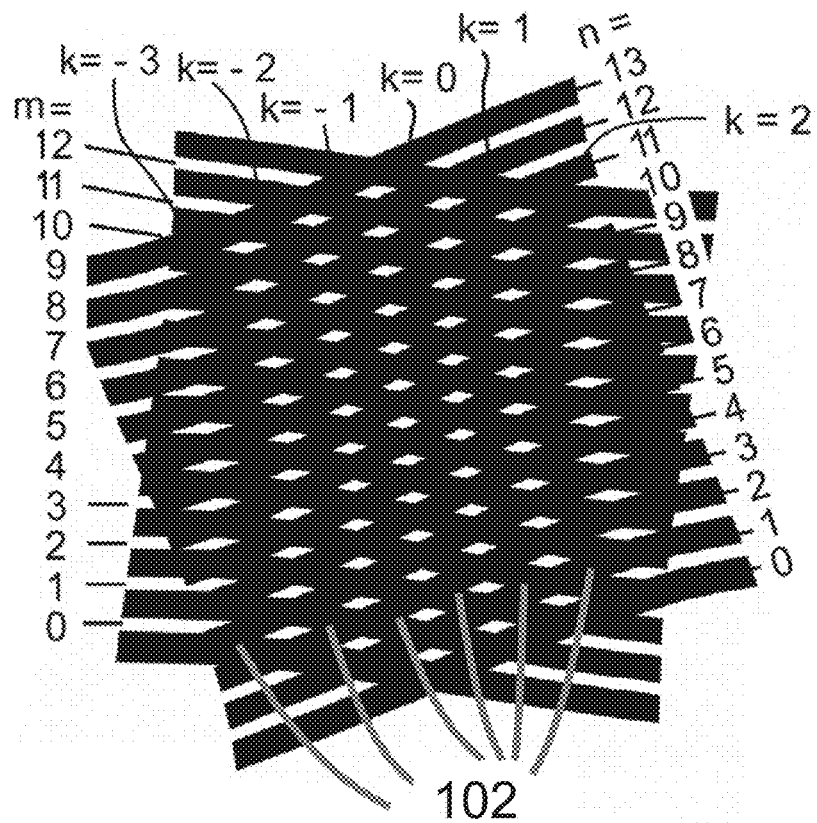
FIG. 1B shows two superposed curvilinear gratings and the corresponding curved moiré fringe lines 102 resulting from the superposition.

The moiré fringes formed by the superposition of indexed line families form a new family of indexed moiré fringe lines whose equation is deduced from the equation of the base and revealing layer line families, see [Amidror 2009]. FIGS. 1A and 1B show the oblique black base layer lines with indices n=0, 1, 2, 3, . . . , the transparent horizontal revealing layer lines with indices m=0, 1, 2, 3, 4, . . . and the moiré fringe lines 101 with indices k=−3, −2, −1, 0, 1. The moiré fringe lines comprise dark moiré lines connecting the intersections of dark oblique and transparent horizontal revealing layer lines. As shown in FIGS. 1A and 1B, each dark moiré line is characterized by an index k which can be expressed by the subtraction of the revealing layer line index m minus the base layer line index n:

$$k = m - n \tag{1}$$

The centerlines of the base layer lines form a line grating parameterized by the integer values of the base layer line index n. This line grating is expressed by $$\psi(x,y) = nT_b \tag{2}$$

where $\psi(x,y)=0$ expresses the implicit equation of either a straight or of a curvilinear line and where $T_b$ defines the line period. For example, in the case of a straight line grating of orientation $\theta$ as in FIG. 1A we have $$y \cos\theta - x \sin\theta = n \cdot T_b \tag{3}$$

where $T_b$ is the perpendicular distance between successive lines.

In the general case, the revealing line grating is expressed by $$\Phi(x,y) = mT_r \tag{4}$$

where $\Phi(x,y)$ expresses the implicit equation of the family of revealing layer lines in the target space. Note that $\Phi(x,y)$ can also be viewed as a transformation from the target space $(x,y)$ to an original space $(x',y')$, with $y'=\Phi(x,y)$ and $x'=x$. Then $T_r$ is the period of the corresponding rectilinear horizontal revealing line grating in the original space. For example, a horizontal revealing line grating is expressed by $$y = mT_r \tag{5}$$

Thanks to equation (1), and by expressing indices n and m according to Eqs. (2) and (4) as functions of x and y, the implicit equation of the moiré fringe lines becomes $$\frac{\Phi(x,y)}{T_r} - \frac{\Psi(x,y)}{T_b} = k \tag{6}$$

Level-line moiré are a particular subset of moiré fringes, where both the revealing layer grating and the base layer grating have substantially the same period, i.e. $T=T_r=T_b$. Level line moirés enable visualizing the level lines of an elevation function $G(x,y)$. For example, by superposing a base layer grating whose horizontal lines are vertically shifted according to the elevation function $G(x,y)$ and a horizontal revealing layer grating having the same line period as the base layer grating, one obtains a level-line moiré.

The horizontally laid out rectilinear base layer grating is described by the line family $$y - G(x,y) = n \cdot T \tag{7}$$

With a horizontal revealing line grating y=m T of the same period T as the base layer grating, we obtain according to Eq. (6) the equation of the moiré fringe lines $$\frac{y}{T} - \frac{y - G(x,y)}{T} = k \Rightarrow G(x,y)/T = k \tag{8}$$

Therefore, the revealed moiré fringe lines form the level lines of elevation function $G(x,y)$.

Let us consider linear or non-linear geometrical transformations applied to both the base and revealing layer line gratings. For example, FIG. 1B shows the result of applying to each grating of FIG. 1A a specific non-linear geometrical transformation. The moiré lines can still be indexed by k=m−n. For level-line moirés, both the revealing layer grating and the base layer grating have the same period, i.e. $T=T_r=T_b$.

In order to define the layout of base and revealing line gratings in the target space (x,y), we consider a geometric transformation $y'=Q(x,y)$ mapping the target space (x,y) containing the rectilinear or curvilinear base and revealing line gratings back into the original space (x',y') containing the rectilinear horizontal base and revealing line gratings.

We obtain the revealing layer's rectilinear or curvilinear line grating in the target space by traversing all discrete pixel locations (x,y) of the target space, finding their corresponding locations (x'=x, y'=Q(x,y)) in the original space, obtaining their intensities, respectively colors and accordingly, setting the intensities, respectively colors, of the corresponding target space pixels. We obtain the base layer's curvilinear line grating in the target space in a similar manner by applying the geometric transformation to obtain original space locations (x'=x, y'=Q(x,y)), then locating the shifted positions y'−G(x,y), obtaining their intensities, respectively colors and setting accordingly the intensities, respectively colors, of the corresponding target space pixels.

By applying the geometric transformations to the revealing and base layers, we obtain their respective layouts Φ(x,y)=Q(x,y) and ψ(x,y)=Q(x,y)−G(x,y). Inserting these layouts into Eq. (6) yields the moiré line family $$\frac{Q(x, y)}{T} - \frac{Q(x, y) - G(x, y)}{T} = k \Rightarrow \frac{G(x, y)}{T} = k \quad (9)$$

Eq. (9) shows that when applying a same geometric transformation Q(x,y) to the base and the revealing layers, one obtains as moiré fringes the level lines of elevation function G(x,y). Geometric transformations comprise several freely choosable parameters, which can be used as keys to construct many different pairs of matching base and revealing layer gratings. This is important for document security applications. More information as well as examples and figures are available in the publication [Chosson and Hersch 2014].

Short Description of the Overall Method

Let us describe the different parts of the present invention. They comprise the following method steps that are embodied by software modules that run partly a on a computing system (e.g. personal computer) and partly on smartphones. On the computing system, the following operations are carried out.

(A) Deriving from each spatial code to be hidden an elevation profile. FIG. 2 shows QR-code 1 (201) and QR-code 2 (202) that, by low pass filtering and inversion become elevation profiles EP 1 (203) and EP 2 (204), respectively.

(B) Creation of a digital base layer multigrating (208) that appears as grayscale, variable intensity or color image and that hides one, two or more invisible spatial codes, by creating gratings, each grating being shifted according to its corresponding elevation profile.

(C) With a reproduction device, reproducing this digital base layer multigrating on paper, plastic or metal, by 2D or 3D printing, by engraving it into plastic or metal, by laser marking of plastic, by lithographic reproduction, or by embedding a piece of metal incorporating the multigrating into a mould and fabricating with this mould multiple exemplars of plastic or metallic items. FIG. 2 BASE (208) shows a variable intensity image made of two curved line gratings, the first one being shifted according to the elevation profile EP 1 (203) and the second one according to elevation profile EP 2 (204).

The computing system of the smartphone executes software functions performing the following operations.

(D) Acquiring by the camera (FIG. 4, 409) of a smartphone 401 a sharp instance of this reproduced multigrating, appearing as grayscale, variable intensity or color image (FIG. 4, 402), performing adaptive thresholding, see reference [Bradley & Roth 2007] and locating its boundary quadrilateral (FIG. 4, 410).

Figure 3:
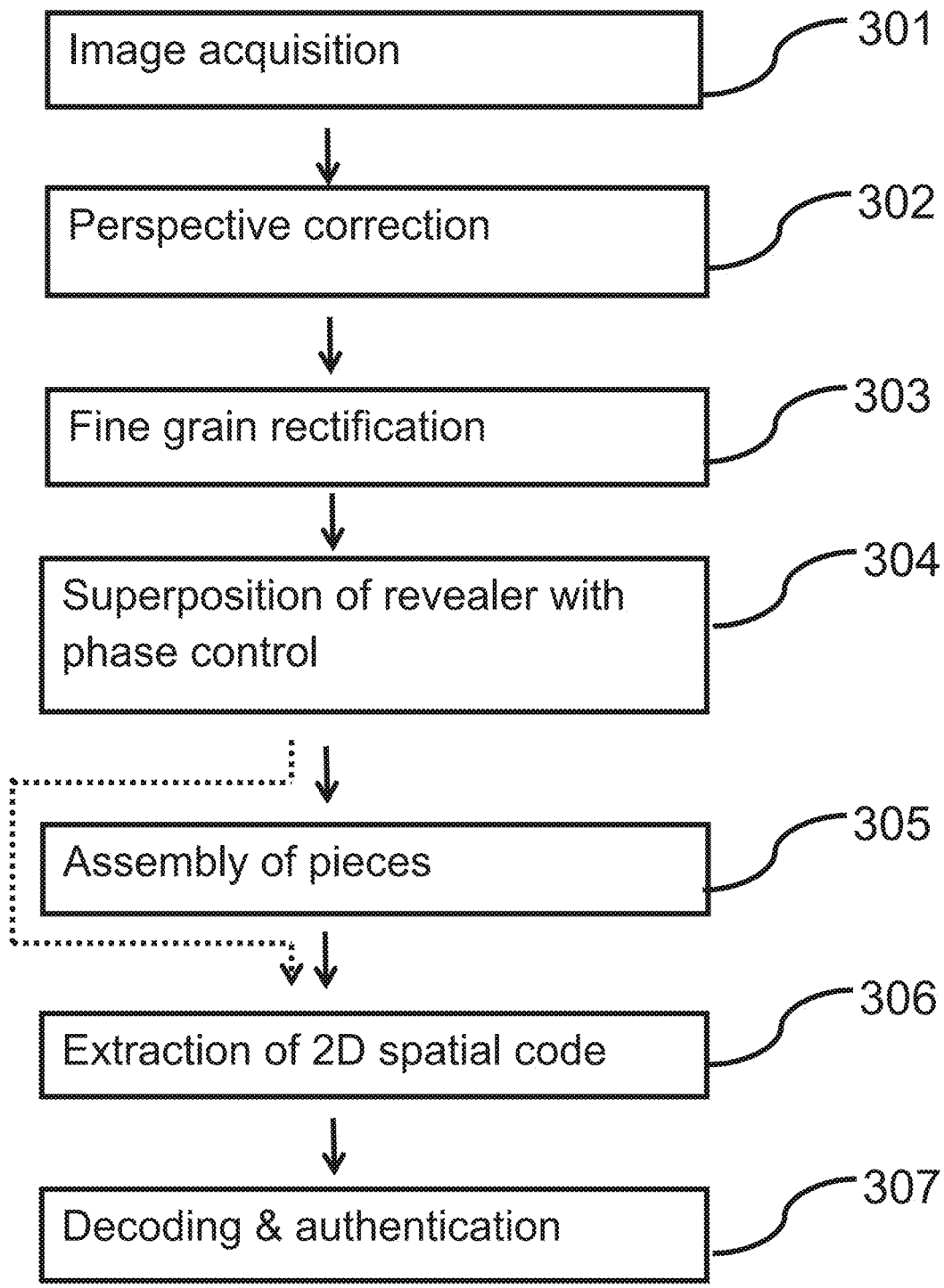
FIG. 3 shows the most important processing steps from the acquisition of the reproduced base layer multigrating 301 and ending with the decoding of the spatial code 307.

(E) Applying perspective distortion correction (FIG. 3, 302).

(F) Applying fine-grain rectification 303.

(G) Superposing on the digital perspectively corrected and rectified multigrating a digital revealing layer and applying to it phase control in order to obtain the highest possible contrast of the low-pass filtered superposition 304;

(H) If applicable, assembling into a single superposition (FIG. 23) several disjoint multigrating superposition pieces (FIG. 22, 221 and 223);

(I) extraction of the hidden spatial codes 306 from the superposition image by applying image processing operations (e.g. erosion or dilation morphology operations, low-pass filtering, histogram modification, thresholding);

(J) decoding these spatial codes (FIGS. 4, 403 and 404);

(K) sending across the Internet 405 the decoded alpha-numeric or binary messages (FIG. 4, 403: "Photo Inc." and 404: "ID: 90262451986") to a remote server for both authentication and tracking purposes (FIG. 4, 406).

As alternative, it is possible to acquire by the smartphone a sharp instance of the multigrating that appears as grayscale, variable intensity or color image and to send it through the Internet (FIG. 4, 405) or through another computer network to a server (FIG. 4, 406). The server then performs the steps (E) to (J) mentioned above, authenticates the resulting spatial code, stores it in its data base and possibly sends a message back to the smartphone with the decoded message and with the indication that it is valid, i.e. in the case of a product, that the product is authentic. In addition, on request, the server may also display information and statistics about received messages that concern this product such as the smartphone identifier, date, time and geographic location when and where the product's base layer multigrating was acquired as well as information about the type of this product (e.g. product name, fabrication country, date of fabrication, series number, countries of distribution, web site).

Synthesis of a Base Layer Hiding Spatial Codes and their Recovery by a Smartphone The synthesis of a level-line moiré revealing a hidden spatial code by a smartphone requires the creation of shifted digital dither base layer gratings and of corresponding digital non-shifted revealing layer gratings. The different base layer dither gratings (FIG. 2, DM1 (205), DM2 (206)) are merged into a single base layer dither multigrating that, after inversion (FIG. 2, DM1&2 (207)), is then used as dither matrix to generate the final digital base layer multigrating (FIG. 2 BASE (208)).

This multigrating base layer image (FIG. 2 BASE) is then reproduced or patterned into a material, by 2D or 3D printing, by engraving it into plastic or metal, by laser marking of plastic, by lithographic reproduction, or by embedding a master piece incorporating the base layer multigrating into a mould and fabricating with this mould multiple exemplars of plastic or metallic items.

After acquisition of the photograph of the reproduced multigrating base layer by a mobile electronic device such as a smartphone, the software of the smartphone carries out the perspective correction of the acquired multigrating image, carries out a further fine grain rectification and superposes on it with phase control one of the digital revealing layer gratings (FIG. 5B or FIG. 6B). If necessary, morphological erosion or dilation operations are applied to remove small white "islands" in the originally black part of the spatial code. The resulting digital superposition image (FIG. 7A or FIG. 7B) is then low-pass filtered for example by a Gaussian filter and its histogram is modified in order to better separate the black parts of the spatial code from their brighter background (result: FIG. 5C or FIG. 6C). If required by the decoding operation, the resulting image is thresholded. The resulting digital spatial code can then be decoded by classical spatial code decoding software library functions.

When the perspectively corrected and fine grain rectified base layer multigrating is superposed at the correct phase with one of its corresponding digital revealing layer gratings (e.g. FIG. 5B), it can reveal the corresponding spatial code as level-line moiré shape (FIG. 7A). When it is superposed with the other corresponding digital revealing layer grating (e.g. FIG. 6B), it can reveal the other spatial code that appears as a different level-line moiré shape (FIG. 7B).

We describe the operations carried out for hiding and revealing by smartphone a spatial code such as a Data Matrix code, an Aztec code, a QR-code, a 1D barcode or a code formed by an alphanumeric string. However, similar operations can be performed for hiding other elements such as graphical elements, logos, ornaments and pictorial elements.

Detailed Steps for Creating the Base Layer Multigrating

The base layer multigrating is formed by several intermingled base layer gratings. The synthesis of a base layer grating requires (a) to create an elevation profile (e.g. FIG. 2, EP 1, 203) from the spatial code (e.g. FIG. 2, QR code 1, 201) to be hidden and (b) to create a rectilinear or curvilinear dither band grating with dither grating bands shifted perpendicularly to their tangent (i.e. in direction of their normal) by an amount that is a function of the elevation profile. In case of a multigrating comprising two or more gratings, each grating is a rectilinear or curvilinear grating defined by its own specific geometric parameters as well as shifted according to its associated elevation profile. After their creation, the individual dither gratings (FIG. 2, DM 1 (205), DM 2 (206)) are merged into a single dither multigrating (FIG. 2, DM 1&2, 207) by applying on each pixel a combination operation that can for example be a "majority" operation, a "minority" operation or a multiplication operation. Then, the resulting dither multigrating is inverted.

The resulting merged and inverted multigrating dither is then used as a dither matrix for dithering an original grayscale, a variable intensity or a color image. The resulting base layer multigrating halftone image (FIG. 2, BASE, 208) is printed, engraved or patterned into a support material. This base layer multigrating halftone image (e.g. FIG. 12C) may appear as a variable intensity halftone, a constant intensity halftone patch or represent a recognizable halftone element such as a face, a logo, a graphic design or a text. Nobody would suspect that such a visual recognizable element embeds an invisible spatial code. The multigrating base halftone image is printed on a substrate such as paper, cardboard or plastic, possibly engraved or patterned into a metallic or plastic substrate, or patterned into a mould used for the fabrication of plastic or metallic items incorporating this multigrating base halftone image. In the case of a color image, the cyan, magenta and yellow halftoned separation layers are obtained by first converting the red, green and blue ("RGB") image to a cyan, magenta and yellow ("CMY") image and then by dithering separately the cyan, magenta and yellow separations using the multigrating dither layer (e.g. FIG. 12B). The resulting dithered separations are then printed or reproduced dot-on-dot, in registration, to yield the base layer coloured multigrating.

Example of the Construction of a Multigrating Base Layer

In order to produce a base layer multigrating incorporating two separate QR-codes, we start with corresponding bilevel shapes representing these codes, as shown in the examples of FIG. 2, QR code 1 (201) and QR code 2 (202). We apply to these bi-level shapes a low pass filter and invert the resulting variable intensity images. We obtain the elevation profiles as shown in the examples of FIG. 2, EP 1 (203) and EP2 (204). Smooth elevation profiles enable creating a base layer with smoothly shifted line gratings.

In order to illustrate the synthesis of a level line moiré revealing a spatial code hidden in the base layer multigrating, we create a base layer made of a grating of dither bands (FIG. 8A, 801). Each band is formed of an intensity gradient (FIG. 8A, 802) perpendicular to the local band tangent. At each (x,y) location, this grating of bands is shifted as a function of the elevation (e.g. proportionally) at that (x,y) location. For example at the location specified by FIG. 8, 803, the bands are shifted towards the right-down (positive x and positive y) direction as a function of the intensity of the elevation profile, see FIG. 9B, 903.

The gratings forming the base or revealing layers can be represent as line families described by implicit equations, see Section "The principle of level-line moirés". For example in the case of a digital revealing layer (FIG. 5B), the transparent center lines of each grating element can be described by the implicit equation $\Phi(x,y)=a\ T_1$, where $\Phi(x,y)$ is the function mapping locations (x,y) of the target grating into corresponding locations of a rectilinear horizontal grating and where $T_1$ is the repetition period of this horizontal grating. In this example (FIG. 5B), we define the layout of a first digital circular revealing layer grating by establishing the equation of the families of lines forming this circular grating:

$$(x-c_x)^2+(y-c_y)^2=(aT_1)^2 \tag{10}$$

where $(c_x, c_y)$ is the center of the circular grating, where $T_1$ is the repetition period, where the integer part of a is a number (similar role as m in FIG. 1A or 1B) specifying the index of a circular line segment within the circular grating. The fractional part of a specifies the current fractional displacement (also called phase shift) in respect to Period $T_1$ of a location (x,y) from a circular grating line given by the integer value of a.

In case that two spatial codes are hidden within the same base layer, we define a second digital revealing layer grating (FIG. 6B) by establishing its family line equation:

$$(x-d_x)^2+(y-d_y)^2=(bT_2)^2 \tag{11}$$

where $(d_x, d_y)$ is the center of the second circular grating, where $T_2$ is the repetition period, where the integer part of b is a number (same role as m in FIG. 1A or 1B) specifying the index of a circular segment within the circular grating. The fractional part of b specifies the current fractional displacement in respect to Period $T_2$ of a location (x,y) from the previous circular grating line given by the integer value of b. FIG. 10 shows an example where two gratings of lines (drawn in white on a gray background) intersect each other, the first grating having lines with indices a, a+1, a+2, . . . , a+p, being defined by Eq. (10) and the second grating having lines with indices b, b+1, b+2, . . . , b+q, being defined by Eq. (11).

The base layer with the dither multigrating (dither matrix) contains line gratings that have the same layout equations as the revealing layer grating equations, but with additional shifts that are a function of the corresponding elevation profiles. In the case of an elevation profile $G_1(x,y)$, the first base layer dither grating has the line family equation $$\sqrt{(x-c_x)^2+(y-c_y)^2}-G_1(x,y)=a\cdot T_1 \tag{12}$$

The second base layer dither grating whose lines are shifted according to $G_2(x,y)$ has the line family equation $$\sqrt{(x-d_x)^2+(y-d_y)^2}-G_2(x,y)=b\cdot T_2 \tag{13}$$

Each of these base layer dither gratings is generated by traversing all (x,y) pixels in the target space, scanline by scanline, pixel by pixel and by performing the following operations.

Here is the detailed description for a base layer grating with center ($u_x$, $u_y$), a period T and an elevation profile G (x,y).

(i) Calculate the distance δ of the current pixel (x,y) to the center ($u_x$, $u_y$) of the circle $$\delta(x,y) = \sqrt{(x-u_x)^2 + (x-u_y)^2} \quad (14)$$

(ii) Subtract from δ(x,y) the value G(x,y) which is either the elevation profile height at the position (x,y) or a function of this elevation profile. This yields position y' within a horizontal variable intensity wedge (FIG. 11):

$$y' = \delta(x,y) - G(x,y) \quad (15)$$

(iii) To obtain the current intensity m(y') within this variable intensity wedge, calculate the modulus of the current position y' in respect to period T and divide by period T:

$$m(y') = \text{Modulo}(y', T)/T \quad (16)$$

(iv) The ratio of the modulus and the period yields the current wedge intensity m(y') that is to be copied at position (x,y) of the target space, i.e. m(x,y)=m(y').

The application of steps (i) to (iv) for each of the two circular gratings with centers ($c_x$, $c_y$) and ($d_x$, $d_y$) and with elevation profiles $G_1(x,y)$ and $G_2(x,y)$, respectively, enables obtaining the two base dither gratings $DM_1(x,y)$ (205) and $DM_2(x,y)$ (206), see FIG. 2.

To obtain the final base dither matrix $DM_{12}(x,y)$, one needs to merge to two base dither gratings $DM_1(x,y)$ and $DM_2(x,y)$. The preferred merging operation comprises three steps:
  a minority operation "Minority" where each pixel (x,y) of the target space takes the lower value of the two candidate dither values $DM_1(x,y)$ and $DM_2(x,y)$,
  a histogram equalization "HistEqu" and
  a further intensity inversion step "Inv".
  We obtain the following formula $$DM_{12}(x,y) = \text{Inv}[\text{HistEqu}[\text{Minority}[DM_1(x,y), DM_2(x,y)]]] \quad (17).$$

The final base layer multigrating is obtained by dithering, i.e. by comparing the intensity level of the original variable intensity image (global image) that is to be shown (FIG. 12A) and the dither values (FIG. 12B) present in the final base dither matrix $DM_{12}(x,y)$. If the intensity value is higher than the dither value, the corresponding base layer pixel is set to white ("1") else to black ("0").

By applying phase control when generating the base and revealing layer gratings, it is possible to considerably improve the decoding rate (FIG. 3, 307) of the obtained spatial code (e.g. QR-code). Note that the minority operation described in Eq. (17) can be also applied when more than two base layer gratings contribute to the multigrating.

Phase Control of Base and Revealing Layer Gratings

In order to explain the method for phase control the base and revealing layer gratings, let us consider FIGS. 13A, 13B and 13C. FIG. 13A shows an enlargement of the top left area of FIG. 2 BASE (208) representing the base layer multigrating (in black). FIG. 13B shows en enlargement of the digital revealing layer grating shown in FIG. 5B, where the black opaque regions of the digital revealing layer grating have been, for the purpose of the illustration, replaced by gray regions. FIG. 13C is an enlargement of the superposition of the base and revealing layer gratings shown in FIGS. 13A and 13B respectively. Note that the white lines 130 represent transparent revealing layer grating lines and that the black lines 131 are part of the base layer multigrating.

The superposition in FIG. 13C is part of the moiré that is obtained and that needs to be further processed in order to obtain a recognizable QR-code, such as the one shown in FIG. 5C. The parts 136 and 138 show the areas where the transparent revealing lines are visible because they reflect white portions of the base layer multigrating. On the parts 137 and 139, the transparent revealing lines are superposed with the black base layer grating lines and therefore do not reflect any light. Therefore, they seem to be absent and the corresponding regions remain black. FIG. 13C shows also the boundaries between the bright and black regions. Boundary 133 (dotted) is the boundary between the external bright region 136 and the black region 137. Boundary 134 is the boundary between the black region 137 and the internal bright region 138. Boundary 135 is the boundary between the internal bright region 138 and the internal black region 139. One may verify that the succession of bright and black regions is the same as in the top left corner of the processed and recovered QR-code of FIG. 5C.

In order to reach the goal of having dark only regions within the "black parts" of the original spatial code and bright regions in the "white parts" of the spatial code, one needs to control the relative phase of the superposition of the two layers. For this purpose it is recommended to proceed as follows.

A. Spatial codes have generally an inside area (FIG. 9A, 901) containing black active pixels and a surrounding border frame area 902 that is totally white. The originally white border frame should be the lowest part of the elevation profile, inducing no shift and the black elements within the inside area should have the highest elevation profile values, inducing a maximal shift. Therefore instead of using directly the low-pass filtered spatial code as elevation profile, it is preferable to invert the intensities of the low pass filtered spatial code. FIG. 9A shows as example the filtered original QR-code and FIG. 9B the inverted filtered QR-code that is then used as elevation profile (see also FIG. 2, 203 and 204).

B. It is important to position the black lines of the base layer multigrating at a known phase position. When the elevation profile is zero, for example within the borders of the base layer multigrating, see FIG. 15, 152, the black lines should start at a known phase, for example phase 0. For this purpose, as shown in Formula (17), we invert the merged dither multigrating that results from the minority combination of the two dither gratings (e.g. FIG. 8A and FIG. 8B). The resulting inverted merged dither multigrating is shown in FIG. 12B. The inverted dither multigrating starts at phase 0 with the highest dither values which then diminish smoothly to reach the lowest dither value at phase 1. FIG. 14, 141 illustrates in one dimension an inverted dither function. At dithering time, global image intensity values lower than e.g. 0.67 generate, starting at phase zero of the period, a black line segment (bilevel value 0) 145. This ensures that black lines of the base layer multigrating are placed from phase 0 of the corresponding gratings. In FIG. 14, phase 0 is where the value of the dither function 141 jumps from 0 to 1. In FIG. 13C, base layer black line 1310 as well as all other base layer black lines located within the border frame of the multigrating are placed at phase 0.

C. In the originally black parts of the spatial code (FIG. 13C or 13D, regions 137 and 139), the elevation profile is high and the shift of the line perpendicular to its tangent is maximal, e.g. line segment 1303 in region 137. In order to ensure that in the originally black parts of the spatial code (FIG. 9A) there remains no white pixels, the revealing grating line should be exactly superposed with the shifted black line segment, as for example white line 1302 in region 137. This requires that the maximal elevation profile intensity, which corresponds to a maximal shift of a base layer line segment, is equal to the initial relative period phase shift of the transparent revealing grating lines. For example, with a maximal normalized elevation profile intensity of 5/12, the initial relative phase shift of the transparent lines should be also 5/12 of the revealing line repetition period T. This means that the equation of the revealing line grating should be Q(x,y)=(m+5/12) T, assuming here that m is the integer value associated to the line index.

D. One must further ensure that the base grating lines are neither too thin nor too thick. If they are too thin, they will not be able to cover the revealing grating lines as is required in areas where the spatial code is black. FIG. 13D, 1306 shows on an originally black QR-code area a base grating line segment covering a revealing grating line segment and therefore preventing light to be reflected through that revealing grating line segment. If the base grating line is too thick, it will cover the revealing grating lines also in white areas of a spatial code. In such a case, the originally white spatial code area will be wrongly assigned the "black" color. As a consequence, the spatial code recognition software module will then not be able to decode that spatial code. The thicknesses of the base layer grating line segments are governed by the dithering operation. FIG. 14 shows in one dimension a representation 141 of a part of a base layer dither grating (FIG. 2, DM 1&2, 207). The global image to be reproduced is an original variable intensity image (e.g. a logo, a text, graphics, a color image) such as the one shown in FIG. 12A, with a representative 1D segment shown in FIG. 14, 144. In a preferred case, one may choose to have as thinnest line segment a width of 0.2 the period T. The intersection of dither function 141 and maximal input intensity 142 at 0.67, may depending on the dither function, yields this minimally thin line segment 145 (black part). One may also choose to have the thickest line segment to have a width of 0.42 the period, i.e. 0.42 T. The corresponding minimal input intensity 143 is 0.45. With the dither function 141, the dithering operation yields a 0.42·T wide line segment 146 (black part). With such preferred limits on the base layer grating line widths, the normalized intensities of an original global image 144 to be reproduced as base layer grating hiding a spatial code need to be set between the minimal intensity value of 0.45 and the maximal intensity value of 0.67.

The basic phase control techniques described in paragraphs A, B, C and D above for creating a base layer grating that is to be reproduced on a substrate such as paper, plastic or metal aim at making sure that the subsequent acquisition of the reproduced base layer by a smartphone will lead, after perspective distortion correction, fine grain rectification, phase-controlled superposition with a corresponding digital revealing layer grating, erosion and/or dilation, low pass filtering, histogram modification and thresholding to a recognizable spatial code, e.g. the QR-code shown in FIG. 18. However, on some reproduction devices, the reproduced base layer multigrating may be subject to small deformations. In such a case, an additional run-time phase control step is required to place the revealing layer grating at the optimal phase or the optimal position in respect to one of the base layer gratings, see Section "Recovering and decoding the hidden message".

Image Acquisition and Sharpness Verification

The image acquisition of the reproduced base layer multigrating is performed in a separate thread of the smartphone. Several images per second are acquired and their sharpness is checked. The person holding the smartphone is asked to center the acquired base multigrating within a displayed frame. Blur occurs due to lack of focus or due to the movement of the smartphone. Generally, after a short time a sharp image appears. Sharpness is checked by the software by applying a simple formula such as the variance of the light intensity reflected from the base layer multigrating. The higher the variance V, the sharper the acquired image. If F(x,y) is the acquired image intensity at position (x,y), then, for a rectangular area of size M by N, the variance V of the intensity is:

$$V = \frac{\sum_{i=1}^{M} \sum_{j=1}^{N} (F(i,j) - \overline{F})^2}{M \cdot N} \qquad (18)$$

where $\overline{F}$ is the average image intensity over the same M by N image area. It also possible to calculate this variance for small regions (e.g. 8×8 pixels) covering the whole image space. The overall variance is then the average of these local region variances. After testing the variance for many different blur levels, one can establish a variance threshold above which the acquired image area is considered to be sharp. To obtain a binary image independent of illumination, the acquired image is then thresholded by an adaptive thresholding algorithm [Bradley & Roth 2007].

Perspective Correction

A captured image of a reproduced base layer multigrating is first checked for sharpness, see section "Image acquisition and sharpness verification". If it exhibits a sufficiently high sharpness, the image is further processed in order to remove the perspective distortion. Perspective distortion removal has the goal of geometrically transforming the captured quadrilateral containing the base layer multigrating surrounded by a rectangular thin frame (FIG. 4, 410), into a rectangular (or square) base layer multigrating (e.g. FIG. 5A, 50) of known width to height ratio. The acquired image is adaptively thresholded, the discrete quadrilateral 410 bordering the base layer grating is detected and its contour is extracted [Suzuki and Abe 1985]. Then a polygonal approximation is performed with the Douglas and Peucker algorithm [Douglas and Peucker 1973]. Finally, only a polygon with 4 vertices is kept. The coordinates of the 4 vertices are the coordinates of the perspectively projected thin rectangular frame surrounding the base layer grating. Thanks to these 4 vertices, one can calculate the 9 coefficients of a perspective transformation matrix mapping the 4 vertices of the original rectangle bordering the reproduced base layer grating into the vertices of the acquired 4 vertex polygon. The aspect ratio of the original rectangular frame is prior knowledge. With the inverse of this perspective transformation matrix, perspectively distorted base layer grating points are transformed into the corresponding rectangular base grating points. In order to obtain the perspectively corrected base layer gratings, the software scans the target rectangular area, scanline by scanline and pixel by pixel, finds by applying the perspective transformation matrix the corresponding location in the perspectively projected (distorted) gratings, and copies its intensity, gray or color value into the current location of the perspectively corrected rectangular area. For more information on the projective transformation (homography) from a world plane, i.e. the plane containing the base layer grating, to the image plane on which the world plane is projected, see [Hartley and Zisseman 2003].

Fine Grain Image Rectification by Applying a Rectification Transformation

Experience has shown that perspective distortion correction is not sufficiently accurate to provide from the acquired base layer grating quadrilateral a perfectly rectangular or square rectified base layer grating that can be superposed with its corresponding digital revealing layer grating. There is therefore a need to perform an additional image rectification operation. This rectification operation relies on the knowledge of the intersection coordinates of the two (or more) gratings of lines present in the base layer. Consider the two intersection gratings of FIG. 12C or of FIG. 13C (black lines). In these intersection gratings, on the borders of the grating (FIG. 15, 152), the grating lines are not shifted, since they correspond to the elevation values zero that are at the borders of the elevation profile (e.g. the inverted QR-code elevation profile of FIG. 9B).

Thanks to Equations (19) and (20) that are similar to Equations (10) and (11), it is possible to calculate for a known initial intersection point $(x_0, y_0)$, see FIG. 10, having increments p=0 and q=0 the corresponding values a and b:

$$(x-c_x)^2+(y-c_y)^2=((a+p)T_1)^2 \quad (19)$$

$$(x-d_x)^2+(y-d_y)^2=((b+q)T_2)^2 \quad (20)$$

This calculation involves obtaining the radial distances $\rho_1$ and $\rho_2$ from $(x_0, y_0)$ to the corresponding circle centers $(c_x, c_y)$ and $(d_x, d_y)$ $$\rho_1 = \sqrt{(x_0-c_x)^2+(y_0-c_y)^2} \quad (21)$$

$$\rho_2 = \sqrt{(x_0-d_x)^2+(y_0-d_y)^2} \quad (22)$$

and obtaining the values of a and b:

$$a=\rho_1/T_1;\ b=\rho_2/T_2 \quad (23)$$

At a next step, coordinates of a next intersection $(x_1, y_1)$ are obtained by setting the values p=1, q=1 (see FIG. 10, 101 and 102) and solving equations (19) and (20) for x and y. Similarly, a further intersection $(x_2, y_2)$ is obtained by setting values p=2, q=2 and solving equations (19) and (20) for x and y. Another intersection $(x_3, y_3)$ is obtained by setting p=1 and q=0, see FIG. 10. Further intersections are obtained by increasing p and/or q. A general solution can be found for obtaining (x,y) as a function of a, p, b, q, $T_1$ and $T_2$, by solving equations (19) and (20), for example by applying the Solve operator in the Mathematica software as shown in the following Mathematica program lines.

$$\text{circ1Grating}:=(x-c_x)^\wedge 2+(y-c_y)^\wedge 2==((a+p)T_1)^\wedge 2; \quad (24)$$

$$\text{circ2Grating}:=(x-d_x)^\wedge 2+(y-d_y)^\wedge 2==((b+q)T_2)^\wedge 2; \quad (25)$$

$$\text{intersect}=\text{Solve}[\{\text{circ1Grating,circ2Grating}\},\{x,y\}]; \quad (26)$$

$$x^{(1)}=x/.\text{intersect}[[1,1]];\ y^{(1)}=y/.\text{intersect}[[1,1]]; \quad (27)$$

$$x^{(2)}=x/.\text{intersect}[[1,2]];\ y^{(2)}=y/.\text{intersect}[[1,2]]; \quad (28)$$

Since two circles intersect at two locations, both solutions must be checked. The solution $(x^{(1)}, y^{(1)})$ or $(x^{(2)}, y^{(2)})$ is chosen for $(x^{i+1}, y^{i+1})$ that is the closest to the previously calculated intersection $(x_1, y_1)$. In cases that the two circular gratings have the same period, one can replace periods $T_1$ and $T_2$ by a single period T.

A software function enables calculating the theoretically correct intersection coordinates along the border band (FIG. 15, 152) of a base layer grating by varying the values of parameters p and q in Equations (19) and (20). Another software function locates the corresponding effective intersection coordinates in the acquired and perspectively corrected base layer multigrating. This is carried out by tracking with an averaging kernel (FIG. 16, 165) having a rectangular size between $T_1$ by $T_2$ and $T_1/\cos \alpha$ by $T_2/\cos \beta$. In the present example, angle $\alpha$ is the angle between the radius 163 of the considered first circle C of center $(c_x, c_y)$ and the vertical and $\beta$ is the angle between the radius 164 of the considered second circle D of center $(d_x, d_y)$ and the horizontal. This rectangular averaging kernel starts from a known theoretical location $(x_0, y_0)$ and moves by pixelwise displacements around this initial location by less than half the kernel dimensions. The location where the averaging kernel yields a minimum (in case of black or dark lines) or a maximum (in case of white or bright lines) is the effective coordinate $(x_0', y_0')$ of the intersection of the two considered lines from the two gratings (FIG. 10).

Then, in order to find the effective coordinates $(x_1', y_1')$ of the next considered intersection, the kernel is displaced from $(x_0', y_0')$ by vector $[(x_1, y_1)-(x_0, y_0)]$. Here again, the kernel moves by pixelwise displacements around its initial location in positive and negative directions by less than half the kernel dimensions. The location where the averaging kernel gives a minimum is the effective coordinate $(x_1', y_1')$ of the considered new intersection of two black grating lines. This process continues until effective coordinates of representative intersection points are found within all parts of the frame (FIG. 15, 152) surrounding the active area 153 of the base layer gratings. Representative locations are locations that are not necessarily following each other as $(x_0, y_0)$, $(x_1, y_1)$, $(x_2, y_2)$ in FIG. 10. One may for example obtain representative locations by considering locations apart by 4 intersections, e.g. in FIG. 10, location $(x_0, y_0)$ followed by location $(x_4, y_4)$, and so on.

After establishing correspondences between theoretical and effective locations of line grating intersections, one can deduce a rectification transformation mapping the effective to the theoretical locations. Such a mapping maps positions on the acquired and perspectively corrected base layer multigrating image to their improved positions. For example, one can derive a linear transformation M mapping effective locations $(x_0', y_0')$, $(x_1', y_1')$, . . . , $(x_n', y_n')$ to improved (or desired) locations $(x_0, y_0)$, $(x_1, y_1)$, . . . , $(x_n, y_n)$. Here are the corresponding equations, where the unknown transformation matrix M is given by its 4 coefficients a, b, c and d:

$$\begin{bmatrix} x_0 & x_1 & \ldots & x_n \\ y_0 & y_1 & \ldots & y_n \end{bmatrix} = \begin{bmatrix} a & b \\ c & d \end{bmatrix} \cdot \begin{bmatrix} x_0' & x_1' & \ldots & x_n' \\ y_0' & y_1' & \ldots & y_n' \end{bmatrix} \quad (29)$$

In short form, we have $$H=M\cdot F \quad (30)$$

where F is the matrix with the effective positions $(x_0', y_0')$, $(x_1', y_1')$, . . . , $(x_n', y_n')$ and where H is the matrix with improved positions $(x_0, y_0)$, $(x_1, y_1)$, . . . , $(x_n, y_n)$.

The coefficients of matrix M are found by minimizing a suitable distance metric, for example the sum of square differences between effective locations and improved locations:

$$M = \mathrm{argmin} \sum \|G - F\|^2 \qquad (31)$$

This can be done by applying the pseudo-inverse operation $(\ )^+$ to matrix F:

$$M = HF^+ \qquad (32)$$

and one obtains the linear transformation matrix $$M = \begin{bmatrix} a & b \\ c & d \end{bmatrix}.$$

The final rectified base layer multigrating grating image is obtained by applying transformation M to the perspectively corrected base layer multigrating image. This may be carried out by scanning the rectified base layer multigrating space, scanline by scanline, and pixel by pixel, and at each pixel location applying the inverse transformation $M^{-1}$, localizing the nearest pixel center on the non-rectified perspectively corrected base layer multigrating image and copying its intensity or color to the current pixel location of the fine-grain rectified base layer multigrating image.

Recovering and Decoding the Hidden Message

The hidden message is obtained by superposing one of the digital revealing layer gratings (e.g. the revealing grating of FIG. 5B or of FIG. 6B) and the corresponding final rectified base layer multigrating. The phase control operations applied on base and revealing layer gratings aim at ensuring that their phase difference is close to ½ the period T at elevation zero and close to zero at a normalized elevation of ½. However, in some multigrating reproduction processes, slight deformation may occur. Such deformations may require an additional real-time phase control operation. Its goal is to obtain the best possible superposition phase between base and revealing layer gratings. For real-time phase control, the software can move the revealer on the top of the base layer pixel by pixel for up to a distance of $\delta = (1.42\ T, 1.42\ T)$ in the horizontal and vertical direction, where T is the revealing layer or base layer grating period. An alternative for strongly curved gratings consists in generating successive revealing layer gratings phase shifted one in respect to the other by a small fraction of the period T. At each superposition position a Gaussian low-pass filter is applied to the superposed layers. Then, a variance metric as described in Eq. (18) is applied to the pixels inside the frame of the spatial code, i.e. to all pixels that are in region 170 (FIG. 17) of the low-pass filtered superposition. In addition, the average intensity within given frame border regions is calculated, e.g. corner regions 171, 172, 173, 174. For superpositions with a "white" frame border, the relative position maximizing the variance metric inside the superposition area 170 is considered to be optimal.

The resulting real-time phase-controlled superposition is checked for the presence of thin white gaps in regions of the spatial code that should be black (e.g. FIG. 13D, 137 or 1304). If present, a morphological dilation step can be carried out to extend by one or a few pixels the black regions or a morphological erosion step can be carried out to erode the white regions by one or a few pixels, depending on the acquisition resolution. The resulting phase-controlled and morphologically processed superposition is then low-pass filtered. Its histogram may be modified to reinforce the white regions.

The last step consists in applying a thresholding function to the resulting low-pass filtered superposition image, for example with Otsu's method [Ohtsu 1979]. Ohtsu's method finds the threshold that minimizes the intra-class variance of the two classes of pixels (gray pixels that become white and gray pixels that become black) or equivalently maximizes the inter-class variance. From this threshold, other thresholds having slightly higher or lower intensities (e.g. $+\frac{1}{255}$, $+\frac{2}{255}$, $-\frac{1}{255}$, $-\frac{2}{255}$) are also tried and the threshold that is finally applied is the one maximizing the variance metric described above (Eq. (18)).

After thresholding, the resulting bilevel spatial code image resembles the one shown in FIG. 18. This resulting code image is the input to a standard code decoder, such as the software ZXing decoder, an open-source, multi-format 1D/2D barcode image processing library.

Partitioned Spatial Code Variants

The synthesized base multilayer grating incorporating the hidden message, e.g. a hidden spatial code, does not need to be printed or reproduced in one piece. One can for example consider a spatial code divided into several pieces lying apart one from another. For example, in FIG. 19, the base layer multigrating parts 190 and 191 instead of being contiguous may be conceived (along line 195) as two separate pieces lying on the top and bottom of a 1D barcode (FIG. 21). However, for fine grain rectification, we need to keep at the border frame of the resulting extended base layer multigrating (FIG. 21, 215) similar intersections as the ones shown at the border frame 192. For this purpose it is necessary to separate (FIG. 20) the spatial code from which the elevation profile is derived into a top part 201 and a bottom part 203 and to insert between them a free space 202 reserved for a graphical element, a picture, a text or a visible code such as a 1D barcode. By carrying out the operations to generate the base layer multigrating, one obtains an extended base layer multigrating (FIG. 21) that contains in areas 211 and 213 the parts incorporating the hidden spatial codes, and in area 212 another element such as the 1D barcode, a visible text or a graphic element. The boundaries 217 of this element break the continuity of the lines forming the base layer multigrating. Since the base layer multigrating has been derived from extended elevation profiles that are generated with extended spatial codes such as the one in FIG. 20, it contains along its border a frame 215 with line intersections that provide support for fine grain rectification.

FIG. 22 shows the phase controlled extended superposition of the acquired, adaptively thresholded, perspectively corrected and fine grain rectified extended base layer multigrating superposed with a corresponding extended digital revealing layer grating. After obtaining the extended superposition comprising the hidden divided spatial code parts 221 and 223, a software function extracts these two hidden spatial code parts 221 and 223 of and reassembles them together (FIG. 23), one 221 above the other 223, with an additional surrounding white frame 234 into a new layer 235 for further processing such as morphological dilation or erosion, low-pass filtering and thresholding. The resulting image is then decodable by a classical code decoding library.

The segmentation and layout of the previous example can be generalized to various partitions and placements of the spatial code. For example one can partition the spatial code (FIG. 24) into 4 parts 241, 242, 243, 244 labeled A, B, C and D. The four parts are for example laid out by surrounding (FIG. 25) a graphical object, text, or a visible code at position 255. Here again, as in FIG. 20, there is a need to establish a partitioned spatial code layout from which the elevation profile is derived by applying low-pass filtering. In the same manner as for the partition in two sections (FIG. 21), the extended base layer multigrating and the extended digital revealing layer are laid out according to the layout shown in FIG. 25.

After phase-controlled superposition of the extended base layer multigrating and a corresponding extended revealing layer grating, the superposition image incorporating the spatial code is reassembled from its parts located at positions 251, 252, 253 and 254 in a similar manner as shown in FIGS. 22 and 23. This reassembled superposition image is further processed and decoded to recover the hidden spatial code.

The capture of extended multigratings enables providing the smartphone holder an overt information item within the space between the hidden spatial code parts. This overt information item may for example be a 1D barcode or QR-code pointing to a Web site giving information about the corresponding product. The capture of the hidden spatial code as well at its transmission to the tracking server is hidden to the smartphone holder. This may be of interest when it is necessary to hide the tracking action.

Supports for Reproducing the Base Layer Multigrating

The base layer multigrating in digital form is prepared by carrying out the steps described in Sections "Detailed steps for creating the multigrating base layer" and "Example of the construction of a multigrating base layer". Once the digital base layer multigrating is ready, it can be reproduced on a given substrate. This reproduction may involve printing with inks on paper, cardboard or plastic. Alternately, it may involve patterning on a plastic, glass, silicon or metal substrate. Patterning technologies comprise photolithography, nanolithography, nanoimprint lithography, or stencil lithography. The patterns generated on a substrate may then be reproduced on a master such as a nickel shim, a PDMS stamp, a polymer stamp, or a silicon stamp. Such stamps allow for the fabrication of many plastic replicas by injection molding, roll-to-roll setup, hot embossing or thermal imprinting.

Smartphone for Authenticating Documents and Articles

The smartphone operable for authenticating documents or articles with a base layer multigrating hiding one, two or more spatial code comprises the following software modules.

i. An image acquisition software module operable for acquiring with the camera of the smartphone a sharp instance of the base layer multigrating and applying to it adaptive thresholding.

ii. A software module operable for detecting the border of the multigrating or the quadrilateral surrounding the multigrating (FIG. 6A, 60) and operable for carrying out the perspective correction.

iii. A software module operable for localizing the intersections of the acquired grating lines, for comparing their actual locations with their calculated theoretical locations, and for carrying out a fine grain rectification.

iv. A software module operable for the phase-controlled superposition of a digital revealing layer grating and the base layer multigrating hiding the spatial code, for applying image processing operations selected from morphological erosion or dilation, low-pass filtering, histogram modification, and thresholding.

v. A software module operable for decoding the superposition image resulting from the image processing operations mentioned in the previous paragraph.

vi. A software module operable for checking the validity of the decoded message and for authenticating the corresponding document or good. Checking the validity of a decoded message can be carried out locally or remotely by verifying that the decoded message is present within a repository or a data base of valid messages.

In addition, a tracking software module running on the smartphone or on the server may register the decoded message together with the smartphone identifier date, time and geographic location of the acquisition.

Within an interactive smartphone application, the presence of the decoded message may be checked by having a user observing the display of the digital revealing layer grating superposed with the acquired, adaptively thresholded, perspectively corrected and fine-grain rectified base layer multigrating hiding the spatial code. The software module carrying out the superposition according to point (iv) may regenerate at successive fractions of seconds successive instances of the revealing layer grating and superpose them with the base layer multigrating. Each instance represents a slightly increased or decreased phase of the revealing layer grating period. Another possibility is to translate the revealing layer grating by fractions of the grating period on top of the base layer multigrating, in horizontal direction, vertical direction or in one of the oblique directions. The successive superpositions are displayed as an animation, with several superpositions per second. The user examining the displayed superpositions will then observe the presence, absence and inversion of a hidden code within the multigrating. In FIG. 26A, the revealing layer grating is placed at the initial phase without vertical or horizontal displacement: the code appears clearly. In FIG. 26B, there is a vertical displacement of $3/12 \cdot T$ of the revealing grating. The code appears to be hidden. In FIG. 26C, there is a vertical displacement of $7/12 \cdot T$ of the revealing layer grating: the code is revealed in inverse mode. The display of these superpositions at successive fractional phases or displacements between base and revealing layer gratings shows the holder of the smartphone that hidden information such as a spatial code is present. This gives the user a first presumption that the document or article incorporating that base layer multigrating is authentic. However, to be really sure, the superposition image showing the spatial code (FIG. 26A) needs to be low-pass filtered, thresholded, decoded and authenticated for example by comparing the resulting message with a list of valid messages.

Authentication and Tracking

The smartphone (FIG. 4, 401) running the software program that carries out the acquisition, processing and decoding (403, 404) of the spatial code hidden into the multigrating 402 is connected 405 by WiFi or by the cellular phone infrastructure to the Internet. Such a smartphone runs also a software module that enables the communication with a software server program that runs on the computing server 406. The program running on the server is operable for receiving and sending messages to the smartphones that perform the acquisition, adaptive thresholding, perspective correction, fine grain rectification, phase-controlled superposition, processing, extraction and decoding of the hidden spatial codes. The server program is also operable to store the received messages in local storage together with their information content such as the day and time of acquisition, the geographic location of the acquisition, and the decoded messages (403, 404).

In case of commercial products, the decoded code message may for example indicate the manufacturer (e.g. 403), the type of product, the product identifier 404 ("ID"), the series number, and the specification of the countries in which the product is allowed to be sold. In case of a security document, the decoded code may indicate the name of the document holder, its address, its birth date, and its identification number.

The server 406 may authenticate the product for which a message has arrived by comparing the decoded alphanumeric or binary message (e.g. message strings such as product ID, series number, country of production) with the alphanumeric or binary messages associated to the list of valid products, stored in a list, in a table or in a database. In case that the received message corresponds to a valid product, a validation message is sent back to the smartphone from which the server received the initial message. As an alternative embodiment, the smartphone application may have its own frequently updated list of valid products and may therefore directly upon decoding the spatial code indicate to the user if the product is authentic or not.

In addition to authentication, the server may establish tracking tables indicating (a) for each individual article in which succession of countries the spatial code of a given article has been acquired, (b) for each type of article, the countries in which the article's spatial codes have been acquired, (c) for each type of article, countries in which the article's spatial codes have been acquired where the article is not allowed to be sold (gray market), (d) acquisitions of "spatial codes" of articles that are not valid and represent therefore potential counterfeits, and (e) acquisitions of spatial codes of articles that have been sold. The spatial codes of articles offered for sale or already sold may be different.

Data from the tracking tables can be displayed in different manners, e.g. graphically as geographic maps showing for each country the number of acquired valid or invalid articles as well as links showing the travel of individual articles from one country to the next.

In case of security documents, the server authenticates the document by comparing the content of the decoded code (e.g. name of the document holder, address, birth date, and identification number) with the content of its own database. In case that the received data corresponds to a valid document, a validation message is sent back to the smartphone from which the server received the initial message. Here also, as an alternative, the smartphone application may have its own frequently updated database of valid documents and may therefore directly upon decoding the spatial code indicate to the smartphone holder if the document is valid or not.

In the same way as for articles, tracking tables for security documents may indicate the succession of countries or locations visited by the document holder, the day and time of the visits, the similarities between visits of two document holders, visits of invalid document holders, and the presence of document holder in countries or at locations without entry validation. In the same way as for articles, corresponding information can also be shown graphically.

The server storage comprising the arrived messages, the server tracking tables and their graphical representation may be accessed locally and displayed on the server's screen (e.g. as html pages incorporating JavaScript) or from a remotely connected 407 computer 408 by logging into the server 406 and accessing the corresponding information (e.g. html pages incorporating JavaScript).

Technological Aspects

The base layer multigrating, the revealing layer gratings and their resulting superposition moiré image showing the spatial codes hidden into the base layer multigrating are displayed in the figures as strongly enlarged and having a period T much larger than in a real implementation. Typical sizes of a multilayer multigrating are 1.5 cm, 1.27 cm and 1 cm, with a line period between 0.1 mm and 0.5 mm, depending on the substrate on which the base layer multigrating is reproduced and on the reproduction process. With a 720 dpi print process, one can achieve a repetition period as small as 0.2 mm. Also the rectangle bordering the multigrating is much thinner than the one displayed in FIG. 5A (50) or in FIG. 6A (60). This rectangle may be touching the lines of the multigrating.

The base layer multigrating is reproduced by a process for transferring a digital bilevel or grayscale image onto a substrate, said process being selected from the set comprising lithographic, photolithographic, photographic, electrophotographic, patterning, engraving, etching, perforating, embossing, vaporizing, material deposition, moulding, 2D printing, and 3D printing processes.

Embodiments of the reproduction process are selected from the set of: (i) printing with ink on paper, (ii) printing with ink on plastic, (iii) deposition of metal on a substrate selected from metal, plastic, silicon and glass, (iv) deposition of plastic on a substrate selected from metal, plastic, silicon and glass, (v) patterning on plastic, (vi) patterning on metal, (vii) patterning on glass, (viii) injection of plastic, (ix) molding of plastic, (x) molding of metal, (xi) 3D printing of plastic, and (xii) 3D printing of metal. Patterning on plastic or metal is often carried out by first creating a negative on a master piece (e.g. nickel) and by fixing this negative within the mould used to create the replicated plastic or metal articles.

Properties, Advantages and Scope of the Present Invention

The present disclosure enables creating a bridge between printed documents as well as marked plastic, glass or metallic articles and the computing systems responsible for their authentication and tracking. The reproduced base layer multigrating hiding the spatial code is surrounded by a rectangle. This surrounding rectangle together with the multigrating incorporating at least two families of lines as well as the controlled phase placement of the grating lines facilitate the processing steps necessary to extract and decode the hidden spatial code. Here is a list of detailed advantages of the present method.

A. The dark or bright rectangle surrounding the reproduced multigrating (FIG. 6A, 60) facilitates the perspective correction of the multigrating acquired by the camera of a smartphone.

B. The acquired, adaptively thresholded and perspectively corrected base layer multigrating is formed by intersecting arrays of lines. Within the border frame (FIG. 9B, area 905) surrounding the internal area of a spatial code, the location of each line and of each intersection (FIG. 15, area 152) is defined by a family of lines equation. This enables deriving a fine grain transformation that geometrically transforms the layout of the acquired and perspectively corrected base layer multigrating so as to bring it as close as possible to its theoretical layout defined by the families of line equations.

C. Inverting the low-pass filtered spatial code and inverting the dither multigrating ensures that at zero elevation the black lines of the base layer multigrating are positioned, according to prior knowledge, exactly at phase 0 of the line period. The digital revealing layer grating is synthesized according its specific family line equation and to its initial relative shift, both also known as prior knowledge. On the bordering frame of the superposition (FIG. 13C, 136), elevation is zero. Within this border frame, a digital revealing layer grating and a corresponding grating present in the acquired, adaptively thresholded, perspectively corrected and fine grain rectified base layer multigrating is defined by the same family line equation, but differs according to a fractional phase difference equal to the initial relative phase shift of the revealing layer grating. This ensures that at elevation zero, the superposition yields "white" and at elevation close to ½ the superposition yields "black". As shown in FIGS. 13D, 17 and 18, an accurate superposition enables extracting the hidden spatial code and decoding it.

D. Often, hundreds or thousands of documents or articles need to be authenticated by the smartphone within a short time. Therefore, authentication needs to be carried out very quickly. Thanks to the presence of the rectangle surrounding the base layer multigrating and to the intersecting families of lines forming the multigrating, the proposed processing steps of perspective correction and fine-grain rectification can be carried out at high speed. The time interval between the correct placement of the smartphone on top of the base layer multigrating and the decoded spatial code message takes in general less than 1 second.

E. Without having access to the software for synthesizing the base layer multigrating, without knowing the parameters of the layout of the gratings and without having technological tools enabling to replicate a base layer multigrating into a specific substrate, potential counterfeiters will have a very hard time to produce faithful counterfeits of the base layer multigratings hiding spatial messages.

F. The spatial code message that is hidden into the base layer multigrating can be specific for each document or article to be protected. The server may receive more than one authentication request for the same article, i.e. possibly for the original article and for its counterfeited copy. Depending on the specific circumstances of time and locations of these acquisitions, the server may come to the conclusion that there is a counterfeit of that document or article or that the original article has been transferred to a country where its presence on the market is illegitimate.

G. The level-line moiré is defined by the layout of the families of lines forming the base layer multigrating. Each grating is a family of lines whose layout is defined by the mathematical equation $y'=Q(x,y)=k \cdot T$ where $Q(x,y)$ can be any function (called layout function) mapping a position $(x,y)$ into a vertical position $y'$ within a horizontal wedge (FIG. 11). As example, the layout of a family of circular lines is given by the function $$Q(x, y) = \sqrt{(x - c_X)^2 + (y - c_y)^2} = k \cdot T,$$

where $(c_x, c_y)$ is the center and k is the line index. Many other functions could be used for $Q(x,y)$, for example straight lines, cosinusoidal lines, spiral lines, etc. In addition, each function is individualized by its parameters, such as the position of the center $(c_x, c_y)$ and the period T for a grating made of circular lines. Level-line moirés are characterized by the fact that one grating of the base multigrating and a corresponding revealing layer grating have the same basic layout, i.e. the same expression $Q(x,y)$ characterizing their overall layout. See Equation (9), where the revealing layer layout is given by $Q(x,y)=(k+f) \cdot T$ and the base layer layout is given by $Q(x,y)=G(x,y)=k \cdot T$, where $G(x,y)$ is the elevation profile and where f represents the initial phase of the revealing layer layout. The exact formulas describing the layout of the gratings forming the base layer multigrating can be used as prior knowledge to create at high-speed within the smartphone the digital revealing layer gratings. In addition, many different matching base layer multigratings and revealing layer gratings can be created. One may for example associate a given base layer multigrating and two corresponding revealing layer gratings having a circular layout with different centers to one customer and another base layer multigrating and corresponding revealing layer gratings having a cosinusoidal layout with given orientations, periods and amplitudes to another customer.

H. A variant of the present invention consists in having the multigrating only at the white border (FIG. 9A, 902) of the hidden spatial code (FIG. 28, 283) and only one of the gratings of the multigrating within the inside of the hidden spatial code (FIG. 28, 284) where the elevation profile might be different from zero and where therefore grating lines are shifted perpendicular to the unshifted grating line tangents. Such a variant is of interest when the process and substrate for reproducing the base layer multigrating does not offer the required resolution to recover more than one hidden spatial code. As shown in FIG. 28B, the frame with the multigrating 285 surrounding the inside single grating 286 can be very thin and therefore nearly invisible. It has however a sufficient number of grating line intersections for performing the fine grain rectification. When superposing the revealing layer grating (FIG. 5B) on top of the acquired, adaptively thresholded, perspectively corrected and fine grain rectified base layer multigrating having only a single grating inside the hidden spatial code region (FIG. 28A, 284 or FIG. 28B, 286), one obtains after low-pass filtering the superposition image that reveals the hidden spatial code.

I. The possibility of tiling the spatial code to be hidden into parts and of inserting a visual element between the parts enables directing the attention of the observer to that visual element. Nobody would suspect that there could be a hidden spatial code distributed over certain locations of an overall graphic design associated to a product or to its package.

J. The present spatial code hiding techniques relying on level-line moiré have a significant advantage in respect to classical overt 1D code or 2D code prints. With overt codes, a counterfeiter could replace an overt code by a "fake code". With the hidden spatial codes, without the software modules described in the present disclosure, he would not be able to create his own hidden spatial codes that are revealable by a smartphone.

K. In several industry branches, place on packages is scarce. Sometimes, it allows only to place standard information, such as a QR-code about the name of a product, its production date, its validity date and a serial number associated to that product. The present invention enables placing hidden spatial codes at other places of the package, for example within the logo or within the background color of the package (light blue, gray, red, etc.). These additional codes can provide additional information about the distribution chain of the article present in the package. This information can be checked at each station of the distribution chain.

L. The same infrastructure that is used to authenticate and track documents and goods can be used to localize persons within a given environment, such as an industrial site, a campus, a museum or an exhibition. Pictures incorporating a base layer multigrating hiding spatial codes are placed on walls (e.g. FIG. 29, 291, 292, 293), posts or doors located within the considered site. Each picture (e.g. 295, 296, 297) with a multigrating hiding one or more spatial codes shows overt visual information (e.g. in FIG. 29, different greek symbols). At the same time, it hides within the spatial codes additional information about the current location (e.g. FIG. 29, locations A, C, B) of the person having performed the acquisition of such a picture. The smartphone 2910 acquires 2911 and adaptively thresholds the picture 296 incorporating the base layer multigrating, performs perspective correction, fine grain rectification, phase-controlled superposition of the revealing layer and the subsequent steps of morphological erosion or dilation, low-pass filtering, histogram modification, thresholding, and decoding of the hidden message (see FIGS. 3 and 27). The decoded message is sent through a network (e.g. the Internet) 2913 to a server (e.g. FIG. 29, 2920) which sends back to the smartphone information related to the position of the smartphone holder. The server is connected to the Internet 2923. In case of a museum or an exhibition, the server, possibly connected through Wi-Fi 2922, may send information about the objects that the smartphone holder is able to observe at its current location. In a simpler variant, the smartphone contains itself information that relates the decoded message with the current position of the smartphone holder and possibly with additional information about objects that are observable from that position.

Challenges for which the Present Invention Finds Novel Solutions

The present invention had to meet a number of challenges in order to be able to reveal within a time interval of less than one second high-resolution spatial codes at a success rate of at least 99%. First of all, to quickly reveal the hidden information, the present invention uses prior knowledge as much as possible. For a given usage scenario, the period and layouts of the revealing layer gratings associated to a reproduced base layer multigrating are known in advance and need not to be calculated from the acquired base layer multigrating. Also the desired geometric positions of the intersections between the gratings of lines of a multigrating can be calculated in advance. In addition, the user is asked to hold the camera so as to center the base layer multigrating (e.g. FIG. 29, 2911) to be acquired within the viewing marks (2912) of the smartphone display (2910). This avoids the need to perform the localization of the multigrating by the program that runs on the smartphone.

Furthermore, to obtain the highest possible decoding rates of the spatial codes deduced from the superposition of base and revealing layer gratings, besides perspective correction, the following operations are performed by the smartphone program:

- a fine grain rectification of the base layer multigrating by relying on the precomputed positions of the intersections between the two gratings of lines along the multigrating borders,
- synthesis of a digital revealing layer with lines positioned at the initial phase corresponding to the maximal normalized elevation within the elevation profile (e.g. ½) and superposition with the fine grain rectified base layer multigrating,
- in order to reveal the hidden binary spatial code, processing operations selected from the following set are applied to the phase-controlled digital superposition: morphology erosion and/or dilation, low-pass filtering, histogram modification, and thresholding.

These operations together with the use of the prior knowledge for the synthesis of the reproduced multigrating hiding the spatial code allow obtaining a highly accurate fast extraction and decoding of the hidden spatial codes.

REFERENCES FROM THE SCIENTIFIC LITERATURE, CITED ABOVE

[Amidror 2009] I. Amidror, The Theory of the Moiré Phenomenon, Vol. 1: Periodic Layers, $2^{nd}$ edition, Section 11.2, Springer, 2009, pp. 353-359

[Bradley & Roth 2007] D. Bradley, G. Roth, Adaptive Thresholding Using the Integral Image, Journal of Graphics Tools, Vol. 12, No. 2, Taylor and Francis, pp. 13-21.

[Chosson and Hersch 2014] S. M. Chosson, R. D. Hersch, Beating Shapes Relying on Moiré Level Lines, ACM Transactions on Graphics (TOG), Vol. 34 No. 1, November 2014, Article No. 9, pp. 1-10.

[Douglas and Peucker 1973] D. H. Douglas, T. K. Peucker, Algorithms for the reduction of the number of points required to represent a digitized line or its caricature, Cartographica: The International Journal for Geographic Information and Geovisualization Vol. 10 No. 2, 1973, 112-122.

[Hartley and Zisserman 2003] R. Hartley, A. Zisserman, Multiple View Geometry in Computer Vision, Section 2.3 Projective transformations, 2nd Edition, Cambridge University Press, 2003, pp. 32-36.

[Otsu 1979] N. Otsu, A threshold selection method from gray-level histograms, IEEE Transactions on Systems, Man and Cybernetics Vol. 9, No. 1, 1979, pp. 62-66.

[Suzuki and Abe 1985] S. Suzuki, K. Abe, Topological structural analysis of digitized binary images by border following, Computer Vision, Graphics, and Image Processing, Vol. 30, No 1, 1985, 32-46.

The invention claimed is:

1. A method for authenticating and tracking security documents or goods by smartphone acquisition of at least one spatial code hidden into a base layer multigrating reproduced on a substrate comprising (a) producing the base layer multigrating and (b) acquisition and processing of said base layer multigrating, where producing said base layer multigrating comprises the steps of:

deriving from each spatial code an elevation profile;
creating the base layer multigrating with grating lines shifted according to the derived elevation profile;
reproducing said base layer multigrating by a process on said substrate;

where the acquisition and processing of said base layer multigrating comprises the steps of:

repeated acquisition of the reproduced base layer multigrating by the camera of the smartphone;
selection of a sharp instance of the acquired base layer multigrating;
applying to the selected base layer multigrating a perspective correction;
applying to the perspectively corrected base layer multigrating a fine grain rectification;
digitally superposing to the perspectively corrected and fine grain rectified multigrating a digital revealing layer grating having substantially the same repetition period as one of the gratings of the perspectively corrected multigrating;
applying to the resulting superposition image processing operations and obtaining the hidden spatial code; and
decoding the obtained spatial code into a message and authenticating each security document.

2. The method of claim 1, where the smartphone performs the acquisition and the selection of a sharp instance of the acquired base layer multigrating and where each of the other processing steps is performed by a computing device selected from the set comprising said smartphone and a computing server.

3. The method of claim 1, where phase control is applied for synthesizing the digital revealing layer grating in order to ensure in the digital superposition the presence of high-intensity lines in originally white regions of the spatial code and the absence of high-intensity lines in originally black regions of the spatial code or vice-versa.

4. The method of claim 3, where one grating of said base layer multigrating is formed by a family of rectilinear or curvilinear lines defined by the implicit equation $Q(x,y)-G(x,y)=k \cdot T$, $Q(x,y)$ being a function of position $(x,y)$, $G(x,y)$ being the elevation profile, T being the line repetition period and k being the line index and where the revealing layer grating corresponding to that base layer grating is formed by the family of rectilinear or curvilinear lines defined by the implicit equation $Q(x,y)=(k+f) \cdot T$, where f is an initial phase difference between the base layer grating and the corresponding revealing layer grating that ensures said phase control.

5. The method of claim 1, where the security document or good is tracked by sending the decoded message to a computing server, together with the smartphone identifier, date, time and location of the multigrating acquisition, where the computing server authenticates the decoded message by comparing it with a list of valid messages, and where tracking comprises storing the decoded message together with the acquisition smartphone identifier, date, time and location information into a tracking data base.

6. The method of claim 1, where said base layer multigrating is a halftone multigrating that is obtained by creating a base layer dither multigrating with a grating band shifted according to said elevation profile and by dithering an original variable intensity image with said base layer dither multigrating.

7. The method of claim 1, where the image processing operations applied to the superposition of the fine grain rectified multigrating and the digital revealing layer grating are selected from the set of morphology erosion, morphology dilation, low-pass filtering, histogram modification, and thresholding operations.

8. The method of claim 1, where said elevation profile is obtained by low-pass filtering and inverting the spatial code, where fine grain rectification is carried out by locating the actual positions of grating line intersections and by applying a rectification transformation minimizing a distance metric between actual and desired grating line intersections, where authentication is carried out by comparing the decoded message with a list of valid messages and where the spatial code is selected from the set of data matrix code, Aztec code, QR-code, 1D barcode and alphanumeric string.

9. The method of claim 1, where the authentication step is performed locally by the smartphone that carried out the acquisition and processing of said base layer multigrating.

10. The method of claim 1, where the fine grain rectified multigrating is superposed with a second digital revealing layer grating, thereby yielding a second message, different from the first one, that is authenticated by comparing it with a list of valid messages.

11. The method of claim 1, where the spatial code is divided into segments separated by space and where the base layer halftone multigrating is an extended multigrating that comprises an additional visible graphical, textual or code element within that space that breaks continuity of part of the multigrating lines.

12. The method of claim 11, where after acquisition, perspective correction and fine grain rectification of said extended multigrating the regions incorporating the spatial code segments are extracted from the superposition of the extended multigrating and of an extended digital revealing layer grating and reassembled to form a single spatial code superposition to be further processed by the image processing, decoding, and authentication steps.

13. The method of claim 1, where said base layer multigrating is reproduced by said process for transferring an image onto the substrate, said process being selected from the set of lithographic, photolithographic, photographic, electrophotographic, patterning, engraving, etching, perforating, embossing, vaporizing, material deposition, molding, 2D printing, and 3D printing processes.

14. The method of claim 1, where the process is selected from the set of:
(i) printing with ink on paper, (ii) printing with ink on plastic, (iii) deposition of metal on a substrate selected from metal, plastic, silicon and glass, (iv) deposition of plastic on a substrate selected from metal, plastic, silicon and glass, (v) patterning on plastic, (vi) patterning on metal, (vii) patterning on glass, (viii) injection of plastic, (ix) molding of plastic, (x) molding of metal, (xi) 3D printing of plastic, and (xii) 3D printing of metal.

15. The method of claim 1, where the base layer multigrating incorporates two different gratings within the originally white borders of the hidden spatial code and only one grating inside the hidden spatial code area.

16. A smartphone operable for authentication and tracking of documents or goods comprising a CPU, a memory, a display, a camera and a network interface as well as software modules operable for acquisition, phase controlled superposition, processing, decoding and authentication of a base layer multigrating hiding a spatial code reproduced on a substrate, said software modules comprising:
(i) a module operable for the repeated acquisition of the reproduced base layer multigrating by the smartphone's camera;
(ii) a module operable for the sharpness evaluation and selection of a sharp instance of said acquired multigrating;
(iii) a module operable for applying to the selected acquired base layer multigrating a perspective correction;
(iv) a module operable for applying to the perspectively corrected base layer multigrating a fine grain rectification;
(v) a module operable for performing digital phase controlled superposition of the base layer fine grain rectified multigrating and a digital revealing layer grating having the same repetition period as one of the gratings of said fine grain rectified multigrating;
(vi) a module operable for applying image processing operations to the resulting phase-controlled superposition and for obtaining the hidden spatial code;
(vii) a module operable for decoding the obtained spatial code into a message and for authenticating each security document.

17. The smartphone of claim 16, where the phase controlled superposition is carried out by synthesizing the revealing layer grating at a phase ensuring in the digital superposition the presence of high-intensity lines in originally white regions of the spatial code and the absence of high-intensity lines in originally black regions of the spatial code or vice-versa.

18. The smartphone of claim 16, where the documents or goods are tracked by sending the decoded message to an authentication and tracking server, together with the smartphone identifier, date, time and location of the multigrating acquisition, where the server authenticates the decoded message by comparing it with a list of valid messages, and where tracking comprises storing the decoded message together with the smartphone identifier, date, time and location of the acquisition into a tracking data base.

19. The smartphone of claim 16, where the image processing operations applied to the phase-controlled superposition of the fine grain rectified multigrating and the corresponding digital revealing layer grating are selected from the set of morphology erosion and dilation, low-pass filtering, histogram modification, and thresholding operations.

20. The smartphone of claim 16, where the fine grain rectified multigrating is superposed with a second digital revealing layer grating, thereby yielding a second spatial code, different from the first one, that is decoded and then authenticated by comparing it with a list of valid messages.

21. The smartphone of claim 16, where the authentication step is performed locally by said smartphone by comparing the obtained message with a list of valid messages.

22. The smartphone of claim 16, where successively displaced or phase shifted instances of the revealing layer grating superposed with the fine grain rectified multigrating are shown as animation to the holder of the smartphone, said animation allowing him verifying the presence of the spatial code.

23. The smartphone of claim 22, where upon interaction with the user the fine grain rectified multigrating is superposed with a second digital revealing layer grating, thereby making visible to the holder of the smartphone also a second spatial code, different from the first one.

24. The smartphone of claim 23, where each grating of the perspectively corrected and fine grain rectified base layer multigrating is formed by a family of rectilinear or curvilinear lines.

25. The smartphone of claim 22, where the spatial codes are selected from the set of data matrix code, Aztec code, QR-code, 1D barcode and alphanumeric string.

26. The smartphone of claim 16, where the fine grain rectified multigrating incorporates two gratings within the originally white borders of the spatial code and only one grating within the black and white inside regions of the spatial code.

27. A computing infrastructure for localizing persons relying on the smartphone acquisition by the person holding the smartphone of a halftone picture comprising a base layer multigrating hiding a spatial code, said computing infrastructure including software modules running on said smartphone operable for
(i) the repeated acquisition of the reproduced base layer multigrating by the smartphone's camera;
(ii) evaluating the sharpness and selecting a sharp instance of said acquired multigrating;
(iii) applying to the selected acquired base layer multigrating a perspective correction;
(iv) applying to the perspectively corrected base layer multigrating a fine grain rectification;
(v) performing digital phase controlled superposition of the base layer fine grain rectified multigrating and of a digital revealing layer grating having the same repetition period as one of the gratings of said fine grain rectified multigrating;
(vi) applying image processing operations to the resulting phase-controlled superposition and obtaining the hidden spatial code;
(vii) decoding the obtained spatial code into a message; and
(viii) localizing said person.

28. The computing infrastructure for localizing persons of claim 27, where the phase controlled superposition is carried out by synthesizing the revealing layer grating at a phase ensuring in the digital superposition the presence of high-intensity lines in originally white regions of the spatial code and the absence of high-intensity lines in originally black regions of the spatial code or vice-versa.

29. The computing infrastructure for localizing persons of claim 27, where the localization of the person holding the smartphone is carried out by sending the obtained message to a server, by having the server finding the associated spatial location and by having the server sending a reply message to the smartphone giving information related to the spatial location of said person.

30. The computing infrastructure for localizing persons of claim 27, where the image processing operations applied to the phase-controlled superposition of the fine grain rectified multigrating and the corresponding digital revealing layer grating are selected from the set of morphology erosion and dilation, low-pass filtering, histogram modification, and thresholding operations.

31. The computing infrastructure for localizing persons of claim 27, where the fine grain rectified multigrating is superposed with a second digital revealing layer grating, thereby yielding a second message, different from the first one.

32. The computing infrastructure for localizing persons of claim 27, where at least one grating of the perspectively corrected and fine grain rectified base layer multigrating is formed by a family of rectilinear or curvilinear lines and where the spatial codes are selected from the set of data matrix code, Aztec code, QR-code, 1D code and alphanumeric string.

33. The computing infrastructure for localizing persons of claim 27, where the localization step is performed locally by the smartphone that carried out the acquisition and processing of said base layer multigrating by comparing the obtained message with messages from a table associating input messages and spatial locations.

\* \* \* \* \*